United States Patent
Hoshino et al.

(10) Patent No.: US 10,538,621 B2
(45) Date of Patent: Jan. 21, 2020

(54) FLUORINATED ETHER COMPOUND, FLUORINATED ETHER COMPOSITION, COATING LIQUID AND ARTICLE

(71) Applicant: AGC Inc., Chiyoda-ku (JP)

(72) Inventors: Taiki Hoshino, Chiyoda-ku (JP); Kazue Toda, Chiyoda-ku (JP); Kenji Ishizeki, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 94 days.

(21) Appl. No.: 15/877,468

(22) Filed: Jan. 23, 2018

(65) Prior Publication Data

US 2018/0142062 A1 May 24, 2018

Related U.S. Application Data

(63) Continuation of application No. PCT/JP2016/075356, filed on Aug. 30, 2016.

(30) Foreign Application Priority Data

Sep. 1, 2015 (JP) .................................. 2015-171987

(51) Int. Cl.
  *C08G 65/336* (2006.01)
  *C08G 65/22* (2006.01)
  *C09K 3/18* (2006.01)
  *C09D 171/00* (2006.01)

(52) U.S. Cl.
  CPC ......... *C08G 65/226* (2013.01); *C08G 65/336* (2013.01); *C08G 2650/04* (2013.01)

(58) Field of Classification Search
  CPC ..................................................... C08G 65/226
  USPC .......................................................... 528/402
  See application file for complete search history.

(56) References Cited

U.S. PATENT DOCUMENTS

2005/0249942 A1  11/2005  Coggio et al.
2010/0129672 A1   5/2010  Hao et al.
2014/0302332 A1  10/2014  Murotani et al.

FOREIGN PATENT DOCUMENTS

JP    02-019385        1/1990
WO    WO 2009/008380 A1   1/2009
WO    WO 2013/121984 A1   8/2013

OTHER PUBLICATIONS

International Search Report dated Nov. 1, 2016 in PCT/JP2016/075356 filed Aug. 30, 2016.

*Primary Examiner* — Duc Truong
(74) *Attorney, Agent, or Firm* — Oblon, McClelland, Maier & Neustadt, L.L.P.

(57) ABSTRACT

To provide a fluorinated ether compound, a fluorinated ether composition and a coating liquid, capable of forming a surface layer excellent in water/oil repellency, abrasion resistance, fingerprint stain removability, lubricity, chemical resistance and light resistance, as well as an article having such a surface layer. A fluorinated ether compound represented by $A^1\text{-}O\text{-}Q^1\text{-}(R^{f1}O)_{m1}\text{---}R^{f2}\text{---}R^{11}\text{---}N[\text{---}R^{12}\text{---}SiR^{13}_{n1}X^1_{3-n1}]_2$, wherein $A^1$: $C_{1-20}$ perfluoroalkyl group, $Q^1$: single bond, fluoroalkylene group containing at least one hydrogen atom, etc., $R^{f1}$, $R^{f2}$: perfluoroalkylene group, m1: integer of from 2 to 200, $R^{11}$: single bond, alkylene group, etc., $R^{12}$: alkylene group, etc., $R^{13}$: monovalent hydrocarbon group, etc., $X^1$: hydrolyzable group, n1: integer of from 0 to 2.

16 Claims, No Drawings

FLUORINATED ETHER COMPOUND, FLUORINATED ETHER COMPOSITION, COATING LIQUID AND ARTICLE

TECHNICAL FIELD

The present invention relates to a fluorinated ether compound, a fluorinated ether composition, a coating liquid and an article.

BACKGROUND ART

A fluorinated compound exhibits high lubricity, water/oil repellency, etc. and thus is suitably used for a surface treatment agent. When water/oil repellency is imparted to the surface of a substrate by such a surface treatment agent, it will be easy to wipe off stain from the surface of the substrate, whereby removability of stain will be improved. Among such fluorinated compounds, a fluorinated ether compound having a poly(oxyperfluoroalkylene) chain with an ether bond (—O—) present at middle in a perfluoroalkyl chain, is particularly excellent in removability of stain of e.g. oils or fats.

A surface treatment agent containing the fluorinated ether compound is used in an application where it is desired to maintain, for a long period of time, a performance (abrasion resistance) whereby water/oil repellency is less likely to be lowered even if rubbed repeatedly with a finger, and a performance (fingerprint stain removability) whereby a fingerprint adhered to a surface can be readily removed by wiping, for example, as a surface treatment agent for a member constituting the surface of a touch panel to be touched with a finger.

In order to impart abrasion resistance to the surface layer formed on the surface of a substrate, for example, a hydrolyzable silyl group may be introduced at a terminal of the fluorinated ether compound, so that the fluorinated ether compound and the substrate will be chemically bonded. As a fluorinated ether compound for the purpose of forming a surface layer excellent in abrasion resistance, a fluorinated ether compound has been proposed wherein to one terminal of the fluorinated ether compound, two hydrolyzable silyl groups are introduced via a branched structure by a nitrogen atom (Patent Document 1).

PRIOR ART DOCUMENT

Patent Document

Patent Document 1: US Patent Application Publication No. 2010/0129672

DISCLOSURE OF INVENTION

Technical Problem

According to the findings by the present inventors, the fluorinated ether compound described in Patent Document 1 has, between a poly(oxyperfluoroalkylene) chain and a hydrolyzable silyl group, a highly polar ester bond insufficient in chemical resistance and light resistance, and thus, the initial water repellency, chemical resistance and light resistance of the surface layer are insufficient.

In a touch panel (digital signage for vending machines, guide plates, etc.) for outdoor use, or in a touch panel mounted on a vehicle, its surface layer is required to have light resistance.

An object of the present invention is to provide a fluorinated ether compound, a fluorinated ether composition and a coating liquid, capable of forming a surface layer excellent in water/oil repellency, abrasion resistance, fingerprint stain removability, lubricity, chemical resistance and light resistance, as well as an article having a surface layer excellent in water/oil repellency, abrasion resistance, fingerprint stain removability, lubricity, chemical resistance and light resistance.

Solution to Problem

The present invention provides a fluorinated ether compound, a fluorinated ether composition, a coating liquid and an article having the following constructions [1] to [13].

[1] A fluorinated ether compound represented by the following formula (1):

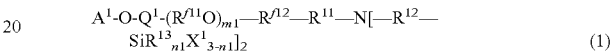

$$A^1\text{-O-}Q^1\text{-}(R^{f11}O)_{m1}\text{—}R^{f12}\text{—}R^{11}\text{—}N[\text{—}R^{12}\text{—}SiR^{13}{}_{n1}X^1{}_{3-n1}]_2 \qquad (1)$$

wherein
$A^1$ is a $C_{1-20}$ perfluoroalkyl group,
$Q^1$ is a single bond, a fluoroalkylene group containing at least one hydrogen atom, a fluoroalkylene group containing at least one hydrogen atom and having an etheric oxygen atom at its terminal (but excluding the terminal on the side bonded to $A^1$-O), a fluoroalkylene group with at least two carbon atoms containing at least one hydrogen atom and having an etheric oxygen atom between its carbon-carbon atoms, or a fluoroalkylene group with at least two carbon atoms containing at least one hydrogen atom and having an etheric oxygen atom between its carbon-carbon atoms and at its terminal (but excluding the terminal on the side bonded to $A^1$-O),
$R^{f11}$ and $R^{f12}$ are each independently a perfluoroalkylene group,
m1 is an integer of from 2 to 200,
$(R^{f11}O)_{m1}$ may be one composed of at least two types of $R^{f11}O$,
$R^{11}$ is a single bond, an alkylene group, an alkylene group having an etheric oxygen atom or —NH— at its terminal (but excluding the terminal on the side bonded to N), an alkylene group with at least two carbon atoms having an etheric oxygen atom or —NH— between its carbon-carbon atoms, or an alkylene group with at least two carbon atoms having an etheric oxygen atom or —NH— between its carbon-carbon atoms and at its terminal (but excluding the terminal on the side bonded to N),
$R^{12}$ is an alkylene group, or an alkylene group with at least two carbon atoms having an etheric oxygen atom or —NH— between its carbon-carbon atoms,
$R^{13}$ is a hydrogen atom or a monovalent hydrocarbon group,
$X^1$ is a hydrolyzable group,
n1 is an integer of from 0 to 2,
two $[\text{—}R^{12}\text{—}SiR^{13}{}_{n1}X^1{}_{3-n1}]$ may not be the same group.
[2] The fluorinated ether compound according to [1], wherein $R^{f11}$ and $R^{f12}$ are each independently a $C_{1-6}$ perfluoroalkylene group.
[3] The fluorinated ether compound according to [1] or [2], wherein $R^{f11}$ and $R^{f12}$ are each independently a perfluoroalkylene group having no branched structure.
[4] The fluorinated ether compound according to any one of [1] to [3], wherein $(R^{f11}O)_{m1}$ has $\{(CF_2O)_{x1}(CF_2CF_2O)_{x2}\}$ (wherein each of x1 and x2 is an integer of at least 1, x1+x2 is an integer of at least 2 and at most m1, and the formula represents a structure wherein x1 pieces of ($CF_2O$) and x2 pieces of ($CF_2CF_2O$) are randomly arranged).

[5] The fluorinated ether compound according to any one of [1] to [4], wherein $(R^{f11}O)_{m1}$ has $(CF_2CF_2O—CF_2CF_2CF_2CF_2O)_{x3}$ (wherein x3 is an integer of at least 1 and at most m1/2).

[6] The fluorinated ether compound according to any one of [1] to [5], wherein $Q^1$ is a single bond, —$R^{f5}$O— or —$R^{f5}$O—$R^{f6}$O— (wherein $R^{f5}$ and $R^{f6}$ are each independently a $C_{2-6}$ fluoroalkylene group having a hydrogen atom).

[7] The fluorinated ether compound according to any one of [1] to [6], wherein $R^{11}$ is a group selected from the group consisting of —$CH_2$—, —$CH_2CH_2$—, —$CH_2CH_2CH_2$—, —$CH_2OCH_2CH_2$— and —$CH_2NHCH_2CH_2$—.

[8] The fluorinated ether compound according to any one of [1] to [7], wherein $R^{12}$ is —$CH_2CH_2CH_2$— or —$CH_2CH_2OCH_2CH_2CH_2$—.

[9] The fluorinated ether compound according to any one of [1] to [8], which has a number average molecular weight of from 500 to 20,000. [10] A fluorinated ether composition comprising
a fluorinated ether compound as defined in any one of [1] to [9], and
a fluorinated ether compound other than the fluorinated ether compound represented by the formula (1), characterized in that
the total proportion of the fluorinated ether compound represented by the formula (1) and other fluorinated ether compound in the fluorinated ether composition, is from 80 to 100 mass % to the fluorinated ether composition, and
the proportion of said other fluorinated ether compound to the total of the fluorinated ether compound represented by the formula (1) and other fluorinated ether compound, is more than 0 mass % and less than 40 mass %.

[11] The fluorinated ether composition according to [10], wherein said other fluorinated ether compound is at least one member selected from the group consisting of the following fluorinated ether compound (2), the following fluorinated ether compound (3) and the following fluorinated ether compound (4):

Fluorinated ether compound (2): A fluorinated ether compound wherein in the fluorinated ether compound represented by the formula (1), a group having said —N[—$R^{12}$—$SiR^{13}_{n1}X^1_{3-n1}]_2$ is bonded to both sides of said $(R^{f11}O)_{m1}$.

Fluorinated ether compound (3): A fluorinated ether compound wherein in the fluorinated ether compound represented by the formula (1), a group having said $A^1$ is bonded to both sides of said $(R^{f11}O)_{m1}$.

Fluorinated ether compound (4): A fluorinated ether compound wherein in the fluorinated ether compound represented by the formula (1), said —N[—$R^{12}$—$SiR^{13}_{n1}X^1_{3-n1}]_2$ is substituted by —N[—$R^{12}$—$SiR^{13}_{n1}X^1_{3-n1}]_{2-t}$[—$R^{15}]_t$ (wherein $R^{15}$ is an unsaturated bond-containing group which becomes —$R^{12}$—$SiR^{13}_{n1}X^1_{3-n1}$ by addition of $HSiR^{13}_{n1}X^1_{3-n1}$, or an isomer group of the unsaturated bond-containing group, and t is 1 or 2).

[12] A coating liquid characterized by comprising a fluorinated ether compound as defined in any one of [1] to [9], or a fluorinated ether composition as defined in [10] or [11], and a liquid medium.

[13] An article characterized by having a surface layer formed of a fluorinated ether compound as defined in any one of [1] to [9] or a fluorinated ether composition as defined in [10] or [11].

Advantageous Effects of Invention

According to the fluorinated ether compound, ether composition and coating liquid of the present invention, it is possible to form a surface layer excellent in water/oil repellency, abrasion resistance, fingerprint stain removability, lubricity, chemical resistance and light resistance.

The article of the present invention has a surface layer excellent in water/oil repellency, abrasion resistance, fingerprint stain removability, lubricity, chemical resistance and light resistance.

DESCRIPTION OF EMBODIMENTS

In this specification, a compound represented by the formula (1) will be referred to as a compound (1). Compounds represented by other formulae will be referred to in the same manner.

In this specification, meanings of the following terms are as follows.

A "perfluoroalkyl group" means a group having all of hydrogen atoms in an alkyl group substituted by fluorine atoms.

A "fluoroalkylene group" means a group having at least one of hydrogen atoms in an alkylene group substituted by fluorine atom.

A "perfluoroalkylene group" means a group having all of hydrogen atoms in an alkylene group substituted by fluorine atoms.

The chemical formula of an oxyperfluoroalkylene group shall be presented to show its oxygen atom on the right hand side of the perfluoroalkylene group.

An "etheric oxygen atom" means an oxygen atom forming an ether bond (—O—) between carbon-carbon atoms.

A "hydrolyzable silyl group" means a group capable of forming a silanol group (Si—OH) by a hydrolysis reaction. For example, it is $SiR^{13}_{n1}X^1_{3-n1}$ in the formula (1).

A "surface layer" means a layer formed at the surface of a substrate.

The "number average molecular weight" of a fluorinated ether compound is calculated by the following method by using NMR spectroscopy.

It is calculated by obtaining the number (average value) of oxyperfluoroalkylene groups based on the terminal groups, by $^1$H-NMR and $^{19}$F-NMR. The terminal groups are, for example, $A^1$ or $SiR^{13}_{n1}X^1_{3-n1}$ in the formula (1).

[Fluorinated Ether Compound]

The fluorinated ether compound of the present invention (hereinafter referred to also as the present compound) is a compound (1) represented by the following formula (1).

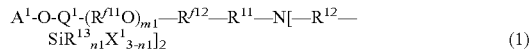

$$A^1\text{-O-}Q^1\text{-}(R^{f11}O)_{m1}\text{—}R^{f12}\text{—}R^{11}\text{—N[—}R^{12}\text{—}SiR^{13}_{n1}X^1_{3-n1}]_2 \tag{1}$$

wherein $A^1$ is a $C_{1-20}$ perfluoroalkyl group, $Q^1$ is a single bond, a fluoroalkylene group containing at least one hydrogen atom, a fluoroalkylene group containing at least one hydrogen atom and having an etheric oxygen atom at its terminal (but excluding the terminal on the side bonded to $A^1$-O), a fluoroalkylene group with at least two carbon atoms containing at least one hydrogen atom and having an etheric oxygen atom between its carbon-carbon atoms, or a fluoroalkylene group with at least two carbon atoms containing at least one hydrogen atom and having an etheric oxygen atom between its carbon-carbon atoms and at its terminal (but excluding the terminal on the side bonded to $A^1$-O), $R^{f11}$ and $R^{f12}$ are each independently a perfluoroalkylene group, m1 is an integer of from 2 to 200, $(R^{f11}O)_{m1}$ may be one composed of at least two types of $R^{f11}O$, $R^{11}$ is a single bond, an alkylene group, an alkylene group having an etheric oxygen atom or —NH— at its terminal (but excluding the terminal on the side bonded to N), an alkylene group with at least two carbon atoms having an etheric oxygen atom or —NH— between its carbon-carbon atoms, or an alkylene group with at least two carbon atoms having an etheric oxygen atom or —NH— between its carbon-carbon atoms and at its terminal (but excluding the terminal on the side bonded to N), $R^{12}$ is an alkylene group, or an alkylene group with at least two carbon atoms having an etheric oxygen atom or —NH— between its carbon-carbon atoms, $R^{13}$ is a hydrogen atom or a monovalent hydrocarbon group, $X^1$ is a hydrolyzable group, n1 is an integer of from 0 to 2, and two $[—R^{12}—SiR^{13}{}_{n1}X^1{}_{3-n1}]$ may not be the same group.

($A^1$ Group)

As $A^1$, from such a viewpoint that the surface layer will be further excellent in lubricity and abrasion resistance, a $C_{1-10}$ perfluoroalkyl group is preferred, a $C_{1-6}$ perfluoroalkyl group is more preferred, and a $C_{1-3}$ perfluoroalkyl group is particularly preferred.

Since $A^1$ has $CF_3$— at its terminal, one terminal of the compound (1) becomes $CF_3$— and the other terminal becomes hydrolyzable silyl groups. According to compound (1) of such a structure, it is possible to form a surface layer with a low surface energy, whereby the surface layer will be excellent in lubricity and abrasion resistance. On the other hand, in a conventional fluorinated ether compound having hydrolyzable silyl groups at both terminals, lubricity and abrasion resistance of the surface layer will be insufficient.

($Q^1$ Group)

$Q^1$ is preferably a single bond, a $C_{1-10}$ fluoroalkylene group containing at least one hydrogen atom, a $C_{1-10}$ fluoroalkylene group containing at least one hydrogen atom and having an etheric oxygen atom at its terminal (but excluding the terminal on the side bonded to $A^1$-O), a $C_{2-10}$ fluoroalkylene group containing at least one hydrogen atom and having an etheric oxygen atom between its carbon-carbon atoms, or a $C_{2-10}$ fluoroalkylene group containing at least one hydrogen atom and having an etheric oxygen atom between its carbon-carbon atoms and at its terminal (but excluding the terminal on the side bonded to $A^1$-O).

In a case where $Q^1$ is not a single bond, the number of hydrogen atoms in $Q^1$ is, from such a viewpoint that the surface layer will be excellent in outer appearance, at least 1, preferably at least 2, particularly preferably at least 3. The number of hydrogen atoms in $Q^1$ is, from such a viewpoint that the surface layer will be further excellent in water/oil repellency, preferably at most (the number of carbon atoms in $Q^1$)×2, particularly preferably at most (the number of carbon atoms in $Q^1$).

As $Q^1$ has hydrogen atom(s), the solubility in the liquid medium of the compound (1) becomes high. Therefore, the compound (1) is less likely to agglomerate in the coating liquid, and further, after application to the surface of a substrate, the compound (1) is less likely to agglomerate during drying, whereby outer appearance of the surface layer will be further excellent.

$Q^1$ is particularly preferably a single bond, —$R^{f5}$O— or —$R^{f5}$O—$R^{f6}$O—. Here, $R^{f5}$ and $R^{f6}$ are each independently a $C_{2-6}$ fluoroalkylene group having hydrogen atom(s). The number of hydrogen atoms in $R^{f5}$ or $R^{f6}$ is preferably 1 or 2.

As $R^{f5}$O, an oxyfluoroalkylene group having hydrogen atom(s) on the carbon atom to which $A^1$-O— is bonded, is preferred, and $CHFCF_2$O is particularly preferred. As $R^{f6}$O, an oxyfluoroalkylene group having hydrogen atom(s) on the carbon atom to which $R^{f5}$O is bonded, is preferred, and $CH_2CF_2$O, $CH_2CF_2CF_2$O, $CH_2CF_2CF_2CF_2$O, etc. may be mentioned. As —$R^{f5}$O—$R^{f6}$O—, —$CHFCF_2$O—$CH_2CF_2$O—, etc. may be mentioned.

(($R^{f11}$O)$_{m1}$)

$R^{f11}$ is, from such a viewpoint that the surface layer will be further excellent in abrasion resistance and fingerprint stain removability, preferably a $C_{1-6}$ perfluoroalkylene group, more preferably a $C_{1-4}$ perfluoroalkylene group, and, from such a viewpoint that the surface layer will be further excellent in lubricity, particularly preferably a $C_{1-2}$ perfluoroalkylene group.

Since the compound (1) has ($R^{f11}$O)$_{m1}$, its content of fluorine atoms is large. Therefore, it is possible to form a surface layer excellent in water/oil repellency, abrasion resistance and fingerprint stain removability.

Further, when $R^{f11}$ is a perfluoroalkylene group having no branched structure, ($R^{f11}$O)$_{m1}$ becomes a linear structure. According to the compound (1) of such a structure, the surface layer will be excellent in abrasion resistance and lubricity. On the other hand, if the poly(oxyperfluoroalkylene) chain has a branched structure, the surface layer tends to be slightly inferior in abrasion resistance and lubricity.

m1 is an integer of from 2 to 200, preferably an integer of from 5 to 150, particularly preferably an integer of from 10 to 100. When m is at least the lower limit value in the above range, the surface layer will be excellent in water/oil repellency. When m1 is at most the upper limit value in the above range, the surface layer will be excellent in abrasion resistance. That is, if the number average molecular weight of the compound (1) is too large, the number of hydrolyzable silyl groups present per unit molecular weight is decreased, whereby abrasion resistance will decrease.

In ($R^{f11}$O)$_{m1}$, when at least two types of $R^{f11}$O are present, the bonding order of the respective $R^{f11}$O is not limited. For example, when $CF_2$O and $CF_2CF_2$O are present, such $CF_2$O and $CF_2CF_2$O may be arranged randomly, alternately or in block.

At least two types of $R^{f11}$O being present is meant that at least two types of $R^{f11}$O different in number of carbon atoms are present, or even if the number of carbon atoms is the same, at least two types of $R^{f11}$O different in the presence or absence of side chain(s) or in the type of the side chain(s) (the number of side chains, the number of carbon atoms in the side chains, etc.), are present.

With respect to arrangement of at least two types of $R^{f11}$O, for example in the case of fluorinated ether compounds in Examples, a structure represented by $\{(CF_2O)_{x1}(CF_2CF_2O)_{x2}\}$ indicates that x1 pieces of ($CF_2$O) and x2 pieces of ($CF_2CF_2$O) are randomly arranged. Further, a structure represented by $(CF_2CF_2O—CF_2CF_2CF_2CF_2O)_{x3}$ indicates that x3 pieces of ($CF_2CF_2$O) and x3 pieces of ($CF_2CF_2CF_2CF_2$O) are alternately arranged.

As ($R^{f11}$O)$_{m1}$, from such a viewpoint that the surface layer will be further excellent in abrasion resistance, fingerprint stain removability and lubricity, preferred is a group having $\{(CF_2O)_{m11}(CF_2CF_2O)_{m12}\}$, $(CF_2CF_2O)_{m13}$, $(CF_2CF_2CF_2O)_{m14}$, $(CF_2CF_2O—CF_2CF_2CF_2CF_2O)_{m15}$, or such a group having from 1 to 4 other ($R^{f11}$O) at its one or both terminals. Such a group having from 1 to 4 other ($R^{f11}$O) at its one or both terminals may, for example, be $(CF_2CF_2O)_2\{(CF_2O)_{m11}(CF_2CF_2O)_{m12}\}$, $(CF_2CF_2O—CF_2CF_2CF_2CF_2O)_{x3}(CF_2CF_2O)$, etc. As ($R^{f11}$O)$_{m1}$, particularly preferred is a group having $\{(CF_2O)_{m11}(CF_2CF_2O)_{m12}\}$.

Here, m11 is an integer of at least 1, m12 is an integer of at least 1, m11+m12 is an integer of from 2 to 200, and the bonding order of m11 pieces of $CF_2$O and m12 pieces of $CF_2CF_2O$ is not limited. m13 and m14 are each an integer of from 2 to 200, and m15 is an integer of from 1 to 100.

($R'^{12}$ Group)

$R'^{12}$ is, from such a viewpoint that the surface layer will be further excellent in abrasion resistance and fingerprint stain removability, preferably a $C_{1-6}$ perfluoroalkylene group, more preferably a $C_{1-4}$ perfluoroalkylene group, and from such a viewpoint that the surface layer will be further excellent in lubricity, particularly preferably a $C_{1-2}$ perfluoroalkylene group.

$R'^{12}$ is, for example, in the case of $(R'^{11}O)_{m1}$ being $\{(CF_2O)_{m11}(CF_2CF_2O)_{m12}\}$ and $(CF_2CF_2O)_{m13}$, a $C_1$ perfluoroalkylene group, in the case of $(CF_2CF_2CF_2O)_{m14}$, a $C_2$ perfluoroalkylene group, and in the case of $(CF_2CF_2O-CF_2CF_2CF_2CF_2O)_{m15}$, a $C_3$ linear perfluoroalkylene group. Further, in the case of $R'^{11}$ being a perfluoroalkylene group having a branch, $R'^{12}$ may become a perfluoroalkylene group having a branch, and, for example, in the case of $R'^{11}$ being $(CF(CF_3)CF_2O)$, $R'^{12}$ becomes $CF(CF_3)$.

When $R'^{12}$ is a perfluoroalkylene group having no branched structure, the surface layer will be excellent in abrasion resistance and lubricity.

($R^{11}$ Group)

$R^{11}$ is preferably a single bond, a $C_{1-10}$ alkylene group, a $C_{1-10}$ alkylene group having an etheric oxygen atom or —NH— at its terminal (but excluding the terminal on the side bonded to N), a $C_{2-10}$ alkylene group having an etheric oxygen atom or —NH— between its carbon atoms, or a $C_{2-10}$ alkylene group having an etheric oxygen atom or —NH— between its carbon atoms and at its terminal (but excluding the terminal on the side bonded to N), particularly preferably a $C_{1-7}$ alkylene group, or a $C_{2-7}$ alkylene group having an etheric oxygen atom or —NH— between its carbon-carbon atoms. From such a viewpoint that the production of the compound (1) will be easy, a group selected from the group consisting of —$CH_2$—, —$CH_2CH_2$—, —$CH_2CH_2CH_2$—, —$CH_2OCH_2CH_2$— and —$CH_2NHCH_2CH_2$— (provided that the left hand side is bonded to $R'^{12}$) is preferred.

$R^{11}$ has a high polarity and has not an ester bond which is inadequate in chemical resistance or light resistance, whereby the surface layer will be excellent in the initial water repellency, chemical resistance and light resistance.

($R^{12}$ Group)

$R^{12}$ is preferably a $C_{1-10}$ alkylene group, or a $C_{2-10}$ alkylene group having an etheric oxygen atom or —NH— between its carbon-carbon atoms, particularly preferably a $C_{1-7}$ alkylene group, or a $C_{2-7}$ alkylene group having an etheric oxygen atom or —NH— between its carbon-carbon atoms. From such a viewpoint that the production of the compound (1) will be easy, —$CH_2CH_2CH_2$— or —$CH_2CH_2OCH_2CH_2CH_2$— (provided that the right-hand side is bonded to Si) is preferred.

$R^{12}$ has a high polarity and does not have an ester bond which is inadequate in chemical resistance or light resistance, whereby the surface layer will be excellent in the initial water repellency, chemical resistance and light resistance.

As $R^{12}$, from such a viewpoint that the surface layer will be excellent in light resistance, one having no etheric oxygen atom is particularly preferred.

Two $R^{12}$ in the compound (1) may be the same group, or may not be the same group.

($SiR^{13}_{n1}X^1_{3-n1}$ Group)

$SiR^{13}_{n1}X^1_{3-n1}$ is a hydrolyzable silyl group.

The compound (1) has two hydrolyzable silyl groups at its terminal. Since the compound (1) of such a structure will be firmly chemically bonded to a substrate, the surface layer will be excellent in abrasion resistance.

Further, the compound (1) has hydrolyzable silyl groups only at one terminal.

The compound (1) of such a structure is less likely to agglomerate, whereby the surface layer will be excellent in outer appearance.

$X^1$ is a hydrolyzable group. The hydrolyzable group is a group which becomes a hydroxy group by a hydrolysis reaction. That is, Si—$X^1$ at the terminal of the compound (1) becomes a silanol group (Si—OH) by a hydrolysis reaction. Silanol groups will further be intermolecularly reacted to form Si—O—Si bonds. Further, a silanol group will undergo a dehydration condensation reaction with a hydroxy group (substrate-OH) at the surface of a substrate, to form a chemical bond (substrate-O—Si).

$X^1$ may, for example, be an alkoxy group, a halogen atom, an acyl group, an isocyanate group (—NCO), etc. The alkoxy group is preferably a $C_{1-4}$ alkoxy group.

As $X^1$, from such a viewpoint that the production of the compound (1) will be easy, a $C_{1-4}$ alkoxy group or a halogen atom is preferred. As the halogen atom, a chlorine atom is particularly preferred. As $X^1$, since outgassing during application will be less, and storage stability of the compound (1) will be excellent, a $C_{1-4}$ alkoxy group is preferred, and in a case where storage stability of the compound (1) for a long time is required, an ethoxy group is particularly preferred, and in a case where the reaction time after coating should be made to be a short time, a methoxy group is particularly preferred.

$R^{13}$ is a hydrogen atom or a monovalent hydrocarbon group. The monovalent hydrocarbon group may, for example, be an alkyl group, a cycloalkyl group, an alkenyl group, an allyl group, etc.

As $R^{13}$, a monovalent hydrocarbon group is preferred, and a monovalent saturated hydrocarbon group is particularly preferred. The number of carbon atoms in the monovalent saturated hydrocarbon group is preferably from 1 to 6, more preferably from 1 to 3, particularly preferably 1 or 2. When the number of carbon atoms in $R^{13}$ is within such a range, the production of the compound (1) will be easy.

n1 is preferably 0 or 1, particularly preferably 0. By the presence of a plurality of $X^1$ in one hydrolyzable silyl group, adhesion to the substrate becomes stronger.

As $SiR^{13}_{n1}X^1_{3-n1}$, $Si(OCH_3)_3$, $SiCH_3(OCH_3)_2$, $Si(OCH_2CH_3)_3$, $SiCl_3$, $Si(OCOCH_3)_3$ or $Si(NCO)_3$ is preferred. From the viewpoint of handling efficiency in industrial production, $Si(OCH_3)_3$ is particularly preferred.

Two $SiR^{13}_{n1}X^1_{3-n1}$ in the compound (1) may be the same group or may not be the same group. From the production efficiency of the compound (1), they are preferably the same group.

(Preferred Form of Compound (1))

As the compound (1), for example, compounds of the following formulae are preferred. Such compounds are preferred from such a viewpoint that they are industrially easy to manufacture and easy to handle, and they are further excellent in water/oil repellency, abrasion resistance, fingerprint stain removability, lubricity, chemical resistance and light resistance.

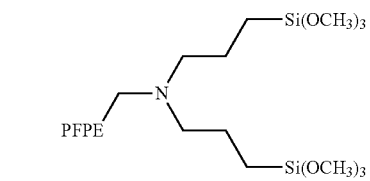

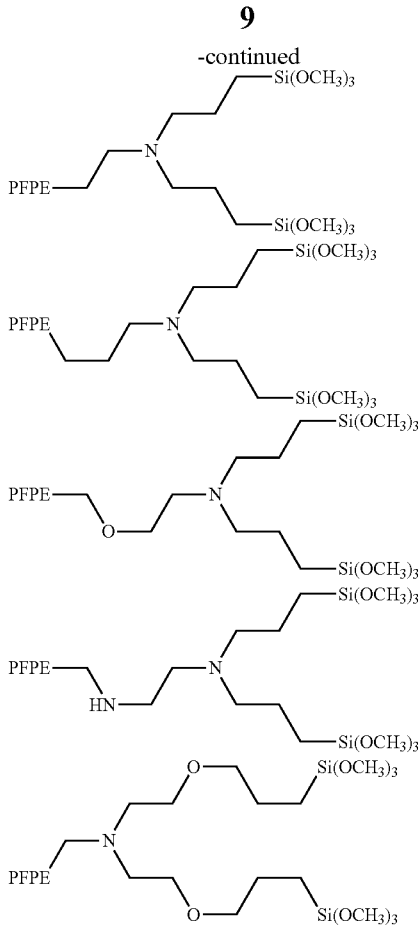

Here, PFPE is a polyfluoropolyether chain, i.e. $A^1$-O-$Q^1$-$(R^{f11}O)_{m1}$—$R^{f12}$—. A preferred form of PFPE is a combination of the above described preferred $A^1$, $Q^1$, $(R^{f11}O)_{m1}$ and $R^{f12}$.

(Method for Producing Compound (1))

As the method for producing the compound (1), for example, the following methods (1) to (3) may be mentioned.

<Method (1)>

Commercially available compound (10) represented by the following formula (10) is to be used as a starting material.

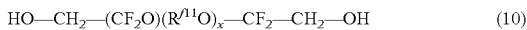
$$HO—CH_2—(CF_2O)(R^{f11}O)_x—CF_2—CH_2—OH \quad (10)$$

In the presence of a basic compound, to the compound (10), $A^1$-O—CF=CF$_2$ is reacted to obtain a mixture of compound (11) represented by the following formula (11), compound (3A) represented by the following formula (3A) and unreacted compound (10).

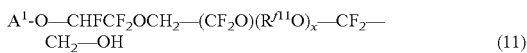
$$A^1\text{-O}—CHFCF_2OCH_2—(CF_2O)(R^{f11}O)_x—CF_2—CH_2—OH \quad (11)$$

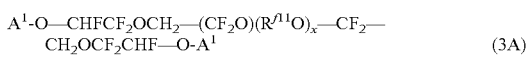
$$A^1\text{-O}—CHFCF_2OCH_2—(CF_2O)(R^{f11}O)_x—CF_2—CH_2OCF_2CHF—O\text{-}A^1 \quad (3A)$$

From the mixture, the compound (11) is isolated, and the compound (11) and $CF_3CF_2CF_2OCF(CF_3)COF$ are subjected to an esterification reaction to obtain compound (12) represented by the following formula (12). The esterification reaction may be a reaction of the compound (11) with other acid fluoride, acid chloride, acid bromide, acid anhydride, etc.

$$A^1\text{-O}—CHFCF_2OCH_2—(CF_2O)(R^{f11}O)_x—CF_2—CH_2—OCOCF(CF_3)OCF_2CF_2CF_3 \quad (12)$$

Using fluorine gas, hydrogen atoms in the compound (12) are substituted by fluorine atoms, to obtain compound (13) represented by the following formula (13). The fluorination step may be carried out, for example, in accordance with the method described in WO2000/56694.

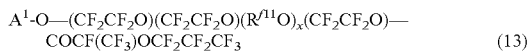
$$A^1\text{-O}—(CF_2CF_2O)(CF_2CF_2O)(R^{f11}O)_x(CF_2CF_2O)—COCF(CF_3)OCF_2CF_2CF_3 \quad (13)$$

To the compound (13), an alcohol (methanol, ethanol, 1-propanol, 2-propanol, etc., which will be hereinafter referred to as ROH, wherein R is an alkyl Group) is reacted to obtain compound (14) represented by the following formula (14).

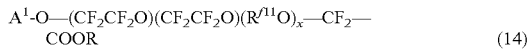
$$A^1\text{-O}—(CF_2CF_2O)(CF_2CF_2O)(R^{f11}O)_x—CF_2—COOR \quad (14)$$

The compound (14) is subjected to hydrogen reduction by using a reducing agent (sodium borohydride, lithium aluminum hydride, etc.) to obtain compound (15) represented by the following formula (15).

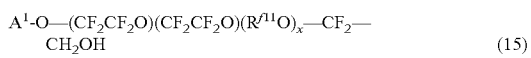
$$A^1\text{-O}—(CF_2CF_2O)(CF_2CF_2O)(R^{f11}O)_x—CF_2—CH_2OH \quad (15)$$

In the presence of a basic compound, to the compound (15), $CF_3SO_2Cl$ is reacted to obtain compound (16) represented by the following formula (16).

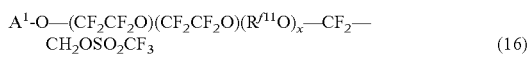
$$A^1\text{-O}—(CF_2CF_2O)(CF_2CF_2O)(R^{f11}O)_x—CF_2—CH_2OSO_2CF_3 \quad (16)$$

In the presence of a basic compound, to the compound (16), $HN(CH_2CH=CH_2)_2$ is reacted to obtain compound (17) represented by the following formula (17).

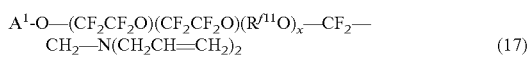
$$A^1\text{-O}—(CF_2CF_2O)(CF_2CF_2O)(R^{f11}O)_x—CF_2—CH_2—N(CH_2CH=CH_2)_2 \quad (17)$$

The compound (17) and $HSiR^{13}{}_{n1}X^1{}_{3-n1}$ are subjected to a hydrosilylation reaction to obtain compound (1A) represented by the following formula (1A). The hydrosilylation reaction is preferably carried out by using a transition metal catalyst such as platinum or a radical generator such as an organic peroxide.

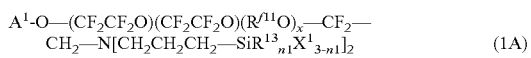
$$A^1\text{-O}—(CF_2CF_2O)(CF_2CF_2O)(R^{f11}O)_x—CF_2—CH_2—N[CH_2CH_2CH_2—SiR^{13}{}_{n1}X^1{}_{3-n1}]_2 \quad (1A)$$

Here, when the above formula is summarized in the order of oxyperfluoroalkylene units, the compound (1A) is represented as follows.

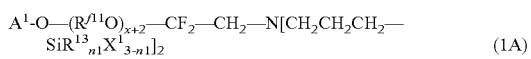
$$A^1\text{-O}—(R^{f11}O)_{x+2}—CF_2—CH_2—N[CH_2CH_2CH_2—SiR^{13}{}_{n1}X^1{}_{3-n1}]_2 \quad (1A)$$

<Method (2)>

The compound (11) obtained in the method (a) is to be used as the starting material.

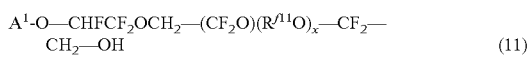
$$A^1\text{-O}—CHFCF_2OCH_2—(CF_2O)(R^{f11}O)_x—CF_2—CH_2—OH \quad (11)$$

In the presence of a basic compound, to the compound (11), $CF_3SO_2Cl$ is reacted to obtain compound (16B) represented by the following formula (16B).

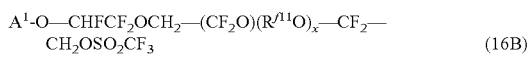
$$A^1\text{-O}—CHFCF_2OCH_2—(CF_2O)(R^{f11}O)_x—CF_2—CH_2OSO_2CF_3 \quad (16B)$$

In the presence of a basic compound, to the compound (16B), $HN(CH_2CH=CH_2)_2$ is reacted to obtain compound (17B) represented by the following formula (17B).

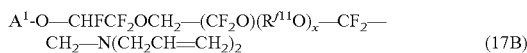
$$A^1\text{-O}—CHFCF_2OCH_2—(CF_2O)(R^{f11}O)_x—CF_2—CH_2—N(CH_2CH=CH_2)_2 \quad (17B)$$

The compound (17B) and $HSiR^{13}{}_{n1}X^1{}_{3-n1}$ are subjected to a hydrosilylation reaction to obtain compound (1B) represented by the following formula (1B).

$$A^1\text{-O}—CHFCF_2OCH_2—(CF_2O)(R^{f11}O)_x—CF_2—CH_2—N[CH_2CH_2CH_2—SiR^{13}{}_{n1}X^1{}_{3-n1}]_2 \quad (1B)$$

Here, when the above formula is summarized in the order of oxyfluoroalkylene units/oxyperfluoroalkylene units, the compound (1B) is represented as follows.

$$A^1\text{-O}—(CHFCF_2O)(CH_2CF_2O)—(R^{f11}O)_x—CF_2—CH_2—N[CH_2CH_2CH_2—SiR^{13}{}_{n1}X^1{}_{3-n1}]_2 \quad (1B)$$

<Method (3)>

Compound (15C) represented by the following formula (15C) obtained by a known method such as the method described in WO2013/121984, is to be used as the starting material.

$$A^1\text{-O}—(R^{f11}O)_x—R^{f12}—CH_2OH \quad (15C)$$

In the presence of a basic compound, to the compound (15C), $CF_3SO_2Cl$ is reacted to obtain compound (16C) represented by the following formula (16C).

$$A^1\text{-O}—(R^{f11}O)_x—R^{f12}—CH_2OSO_2CF_3 \quad (16C)$$

In the presence of a basic compound, to the compound (16C), $HN(CH_2CH=CH_2)_2$ is reacted to obtain compound (17C) represented by the following formula (17C).

$$A^1\text{-O}—(R^{f11}O)_x—R^{f12}—CH_2—N(CH_2CH=CH_2)_2 \quad (17C)$$

The compound (17C) and $HSiR^{13}{}_{n1}X^1{}_{3-n1}$ are subjected to a hydrosilylation reaction to obtain compound (1C) represented by the following formula (1C).

$$A^1\text{-O}—(R^{f11}O)_x—R^{f12}—CH_2—N[CH_2CH_2CH_2—SiR^{13}{}_{n1}X^1{}_{3-n1}]_2 \quad (1C)$$

(The Present Compound)

The present compound may be a single compound composed of one type of compound (1), or may be a mixture composed of at least two types of compound (1) different in $A^1$, $Q^1$, $(R^{f11}O)_{m1}$, $R^{f12}$, $R^{11}$, $R^{12}$, $SiR^{13}{}_{n1}X^1{}_{3-n1}$, etc.

In the present invention, compound (1) being a single compound is meant for the same group of compounds except having a distribution in the number of m1.

The number average molecular weight of the present compound is preferably from 500 to 20,000, more preferably from 800 to 10,000, particularly preferably from 1,000 to 8,000. When the number average molecular weight is within such a range, the abrasion resistance will be excellent.

[Fluorinated Ether Composition]

The fluorinated ether composition of the present invention (hereinafter referred to also as the present composition) is a composition comprising the compound (1) and a fluorinated ether compound other than the compound (1). Such other fluorinated ether compound may, for example, be a fluorinated ether compound by-produced in the production process of the compound (1), a known (particularly commercially available) fluorinated ether compound to be used in the same application as the compound (1), etc. Such other fluorinated ether compound is preferably a compound which is less likely to reduce the properties of the compound (1), and its relative content to the compound (1) in the present composition is preferably an amount which is less likely to reduce the properties of the compound (1).

In a case where other fluorinated ether compound is a fluorinated ether compound which is by-produced in the production process of the compound (1), the purification of the compound (1) in the production of the compound (1) becomes easy, and it is possible to simplify the purification process. In the case where other fluorinated ether compound is a known fluorinated ether compound which is used in the same application as the compound (1), there may be a case where a new function or effect to supplement the properties of the compound (1) will be exhibited.

Said other fluorinated ether compound is preferably at least one member selected from the group consisting of the following fluorinated ether compound (2), the following fluorinated ether compound (3) and the following fluorinated ether compound (4).

Fluorinated ether compound (2): A fluorinated ether compound wherein in the fluorinated ether compound represented by the above formula (1), a group having said $—N[—R^{12}—SiR^{13}{}_{n1}X^1{}_{3-n1}]_2$ is bonded to both sides of said $(R^{f11}O)_{m1}$.

Fluorinated ether compound (3): A fluorinated ether compound wherein in the fluorinated ether compound represented by the above formula (1), a group having said $A^1$ is bonded to both sides of said $(R^{f11}O)_{m1}$.

Fluorinated ether compound (4): A fluorinated ether compound wherein in the fluorinated ether compound represented by the above formula (1), said $—N[—R^{12}—SiR^{13}{}_{n1}X^1{}_{3-n1}]_2$ is substituted by $—N[—R^{12}—SiR^{13}{}_{n1}X^1{}_{3-n1}]_{2-t}[—R^{15}]_t$ (wherein $R^{15}$ is an unsaturated bond-containing group which becomes $—R^{12}—SiR^{13}{}_{n1}X^1{}_{3-n1}$ by addition of $HSiR^{13}{}_{n1}X^1{}_{3-n1}$, or an isomer group of the unsaturated bond-containing group, and t is 1 or 2).

From such a viewpoint that it is less likely to reduce the properties of the compound (1), the fluorinated ether compound (2) is preferably the after-described compound (2), the fluorinated ether compound (3) is preferably the after-described compound (3), and the fluorinated ether compound (4) is preferably the after-described compound (4).

(Compound (2))

Compound (2) is a fluorinated ether compound represented by the following formula (2).

$$[X^2{}_{3-n2}R^{23}{}_{n2}Si—R^{22}—]_2N\text{-}Q^2\text{-}(R^{f21}O)_{m2}—R^{f22}—R^{21}—N[—R^{22}—SiR^{23}{}_{n2}X^2{}_{3-n2}]_2 \quad (2)$$

Here, $Q^2$ is a single bond, an alkylene group, an alkylene group having an etheric oxygen atom or —NH— at its terminal (but excluding the terminal on the side bonded to N), an alkylene group with at least two carbon atoms having an etheric oxygen atom or —NH— between its carbon-carbon atoms, an alkylene group with at least two carbon atoms having an etheric oxygen atom or —NH— between its carbon-carbon atoms and at its terminal (but excluding the terminal on the side bonded to N), a fluoroalkylene group containing at least one hydrogen atom, a fluoroalkylene group containing at least one hydrogen atom and having an etheric oxygen atom or —NH— at its terminal (but excluding the terminal on the side bonded to N), a fluoroalkylene group with at least two carbon atoms containing at least one hydrogen atom and having an etheric oxygen atom or —NH— between its carbon-carbon atoms, or a fluoroalkylene group with at least two carbon atoms containing at least one hydrogen atom and having an etheric oxygen atom or —NH— between its carbon-carbon atoms and at its terminal (but excluding the terminal on the side bonded to N), $R^{f21}$ and $R^{f22}$ are each independently a perfluoroalkylene group, m2 is an integer of from 2 to 200, $(R^{f21}O)_{m2}$ may be one composed of at least two types of $R^{f21}O$, $R^{21}$ is a single bond, an alkylene group, an alkylene group having an etheric oxygen atom or —NH— at its terminal (but excluding the terminal on the side bonded to N), an alkylene group with at least two carbon atoms having an etheric oxygen atom or —NH— between its carbon-carbon atoms, or an alkylene group with at least two carbon atoms having an etheric oxygen atom or —NH— between its carbon-carbon atoms and at its terminal (but excluding the terminal on the side bonded to N), $R^{22}$ is an alkylene group, or an alkylene group with at least two carbon atoms having an etheric oxygen atom or —NH— between carbon atoms, $R^{23}$ is a hydrogen atom or a monovalent hydrocarbon group, $X^2$ is a hydrolyzable group, n2 is an integer of from 0 to 2, and four $[-R^{22}-SiR^{23}{}_{n2}X^2{}_{3-n2}]$ may not all be the same group.

$Q^2$ may be the same one as $R^{11}$ or $Q^1$ in the compound (1), and the preferred form is also the same.

In a case where $Q^2$ is a fluoroalkylene group containing at least one hydrogen atom, or a fluoroalkylene group with at least two carbon atoms containing at least one hydrogen atom and having an etheric oxygen atom or —NH— between its carbon-carbon atoms, and there is no etheric oxygen atom or —NH— at the terminal of $Q^2$ on the side bonded to $(R^{f21}O)_{m2}$, at least one hydrogen atom is bonded to the carbon atom at the terminal of $Q^2$ on the side bonded to $(R^{f21}O)_{m2}$.

$(R^{f21}O)_{m2}$, $R^{f22}$, $R^{21}$, $R^{22}$ and $SiR^{23}{}_{n2}X^2{}_{3-n2}$ may, respectively, be the same ones as $(R^{f11}O)_{m1}$, $R^{f12}$, $R^{11}$, $R^{12}$ and $SiR^{13}{}_{n1}X^1{}_{3-n1}$ in the compound in (1), and their respective preferred forms are also the same.

(Method for Producing Compound (2))

As the method for producing the compound (2), for example, the following methods (4) may be mentioned.

<Method (4)>

Commercially available compound (10) represented by the following formula (10) is to be used as the starting material.

$$HO-CH_2-CF_2O(R^{f11}O)_x-CF_2-CH_2-OH \quad (10)$$

In the presence of a basic compound, to the compound (10), $CF_3SO_2Cl$ is reacted to obtain compound (18) represented by the following formula (18).

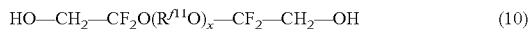
$$CF_3SO_2OCH_2-(CF_2O)(R^{f11}O)_x-CF_2-CH_2OSO_2CF_3 \quad (18)$$

In the presence of a basic compound, to the compound (18), $HN(CH_2CH=CH_2)_2$ is reacted to obtain compound (19) represented by the following formula (19).

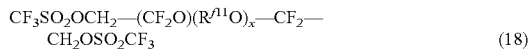
$$(CH_2=CHCH_2)_2N-CH_2-(CF_2O)(R^{f11}O)_x-CF_2-CH_2-N(CH_2CH=CH_2)_2 \quad (19)$$

The compound (19) and $HSiR^{23}{}_{n2}X^2{}_{3-n2}$ are subjected to a hydrosilylation reaction to obtain compound (2A) represented by the following formula (2A).

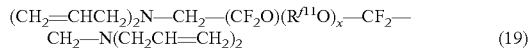
$$[X^2{}_{3-n2}R^{23}{}_{n2}Si-CH_2CH_2CH_2]_2N-CH_2-(CF_2O)(R^{f11}O)_x-CF_2-CH_2-N[CH_2CH_2CH_2-SiR^{23}{}_{n2}X^2{}_{3-n2}]_2 \quad (2A)$$

(Compound (3))

Compound (3) is a fluorinated ether compound represented by the following formula (3).

$$A^{31}-O-Q^{31}-(R^{f31}O)_{m3}-[Q^{32}-O]_p-A^{32} \quad (3)$$

Here, $A^{31}$ and $A^{32}$ are each independently a $C_{1-20}$ perfluoroalkyl group, $Q^{31}$ is a single bond, a fluoroalkylene group containing at least one hydrogen atom, a fluoroalkylene group containing at least one hydrogen atom and having an etheric oxygen atom at its terminal (but excluding the terminal on the side bonded to $A^{31}$-O), a fluoroalkylene group with at least two carbon atoms containing at least one hydrogen atom and having an etheric oxygen atom between its carbon-carbon atoms, or a fluoroalkylene group with at least two carbon atoms containing at least one hydrogen atom and having an etheric oxygen atom between its carbon-carbon atoms and at its terminal (but excluding the terminal on the side bonded to $A^{31}$-O), $Q^{32}$ is a fluoroalkylene group containing at least one hydrogen atom, or a fluoroalkylene group with at least two carbon atoms containing at least one hydrogen atom and having an etheric oxygen atom between its carbon-carbon atoms, $R^{f31}$ is a perfluoroalkylene group, m3 is an integer of from 2 to 200, $(R^{f31}O)_{m3}$ may be one composed of at least two types of $R^{f31}O$, and p is 0 when $Q^{31}$ is a single bond, and is 1 when $Q^{31}$ is other than a single bond.

$A^{31}$, $Q^{31}$, $(R^{f31}O)_{m3}$, $Q^{32}$ and $A^{32}$ may, respectively, be the same ones as $A^1$, $Q^1$, $(R^{f31}O)_{m3}$, $Q^1$ (but excluding a single bond) and $A^1$ in the compound (1), and the respective preferred forms are also the same. From such a viewpoint that a compound by-produced during the production of the compound (1) can be effectively utilized, they are preferably the same as $A^1$, $Q^1$, $(R^{f11}O)_{m1}$, $Q^1$ (but excluding a single bond) and $A^1$, respectively, in the compound (1).

In a case where $Q^{31}$ is a fluoroalkylene group containing at least one hydrogen atom, or a fluoroalkylene group with at least two carbon atoms containing at least one hydrogen atom and having an etheric oxygen atom between its carbon-carbon atoms, and no etheric oxygen atom is present at the terminal of $Q^{31}$ on the side bonded to $(R^{f31}O)_{m3}$, at least one hydrogen atom is bonded to the carbon atom at the terminal of $Q^{31}$ on the side bonded to $(R^{f31}O)_{m3}$.

(Method for Producing Compound (3))

As the method for producing the compound (3), for example, the following methods (5) and (6) may be mentioned.

<Method (5)>

From a mixture of the compound (11), compound (3A) and unreacted compound (10) obtained in the method (1), the compound (3A) is isolated.

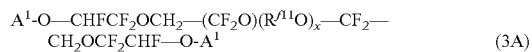
$$A^1-O-CHFCF_2OCH_2-(CF_2O)(R^{f11}O)_x-CF_2-CH_2OCF_2CHF-O-A^1 \quad (3A)$$

Here, when the above formula is summarized in the order of oxyfluoroalkylene units/oxyperfluoroalkylene units, the compound (3A) is represented as follows.

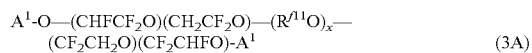
$$A^1-O-(CHFCF_2O)(CH_2CF_2O)-(R^{f11}O)_x-(CF_2CH_2O)(CF_2CHFO)-A^1 \quad (3A)$$

<Method (6)>

The compound (3A) is fluorinated by fluorine gas to obtain compound (3B).

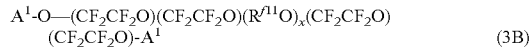
$$A^1-O-(CF_2CF_2O)(CF_2CF_2O)(R^{f11}O)_x(CF_2CF_2O)(CF_2CF_2O)-A^1 \quad (3B)$$

As the compound (3) wherein $Q^{31}$ is a single bond, p is 0, a commercially available product may be used. As such a commercially available product, FOMBLIN (registered trademark) M, FOMBLIN (registered trademark) Y, FOMBLIN (registered trademark) Z (manufactured by Solvay Solexis, Inc.), Krytox (registered trademark) (manufactured by DuPont), Demnum (registered trademark) (manufactured by Daikin Industries, Ltd.), etc. may be mentioned.

The compound (4) is a compound wherein in the compound (1), $-N[-R^{12}-SiR^{13}{}_{n1}X^1{}_{3-n1}]_2$ is substituted by $-N[-R^{12}-SiR^{13}{}_{n1}X^1{}_{3-n1}]_{2-t}[-R^{15}]_t$, and the portion other than $-N[-R^{12}-SiR^{13}{}_{n1}X^1{}_{3-n1}]_{2-t}[-R^{15}]_t$ is the same as in the compound (1). $R^{15}$ is a group which becomes $[-R^{12}-SiR^{13}{}_{n1}X^1{}_{3-n1}]$ by a hydrosilylation reaction, or its isomer group, and t is 1 or 2.

As described above, by a hydrosilylation reaction of adding $HSiR^{13}{}_{n1}X^1{}_{3-n1}$ to an alkenyl moiety having an unsaturated group at its terminal, $[-R^{12}-SiR^{13}{}_{n1}X^1{}_{3-n1}]$ will be formed. For example, by adding $HSiR^{13}{}_{n1}X^1{}_{3-n1}$ to —N(CH$_2$CH=CH$_2$)$_2$, —N[—CH$_2$CH$_2$CH$_2$—SiR$^{13}_{n1}$X$^1_{3-n1}$]$_2$ will be formed. (CH$_2$CH=CH$_2$) in such a case is R$^{15}$. In the hydrosilylation reaction, there may be a case where a side reaction takes place to form an alkenyl group so-called an inner olefin wherein the terminal unsaturated group in R$^{15}$ is isomerized to a non-terminal position. For example, —CH$_2$CH=CH$_2$ will be isomerized to —CH=CHCH$_3$. An alkenyl moiety having an unsaturated group at a non-terminal position will remain without reacting with HSiR$^{13}_{n1}$X$^1_{3-n1}$.

In the hydrosilylation reaction in the production of the compound (1), when R$^{15}$ remains unreacted or when R$^{15}$ is isomerized, a compound with its terminal being —N[—R$^{12}$—SiR$^{13}_{n1}$X$^1_{3-n1}$]$_{2-t}$[—R$^{15}$]$_t$ will be by-produced, and this compound is the compound (4).

(Composition of the Present Composition)

The total proportion of the present compound and other fluorinated ether compound in the present composition, is preferably from 80 to 100 mass %, particularly preferably from 85 to 100 mass %, to the present composition. That is, the proportion of impurities is preferably at most 20 mass %, particularly preferably at most 15 mass %. When the proportion the present compound and other fluorinated ether compound is within the above range, the surface layer will be excellent in water/oil repellency, abrasion resistance, fingerprint stain removability, lubricity, chemical resistance and light resistance.

The proportion of other fluorinated ether compound to the total of the present compound and other fluorinated ether compound is preferably more than 0 mass % and less than 40 mass %, more preferably more than 0 mass % and at most 30 mass %, particularly preferably more than 0 mass % and at most 20 mass %. That is, the proportion of the present compound is preferably more than 60 mass % and less than 100 mass %, more preferably at least 70 mass % and less than 100 mass %, particularly preferably at least 80 mass % and less than 100 mass %. When the proportions of the present compound and other fluorinated ether compound are within the above ranges, the surface layer will be excellent in water/oil repellency, abrasion resistance, fingerprint stain removability, lubricity, chemical resistance and light resistance.

Further, in a case where as other fluorinated ether compound, at least one member of the compound (2), the compound (3) and the compound (4) is contained, the composition of the present composition will be as follows.

In the present ether composition, the total proportion of the present compound, the compound (2), the compound (3) and the compound (4) is preferably more than 60 mass % and at most 100 mass %, more preferably from 70 to 100 mass %, particularly preferably from 80 to 100 mass %, to the present ether composition. Namely, the total proportion of impurities and fluorinated ether compounds other than the present compound, the compound (2), the compound (3) and the compound (4), is preferably less than 40 mass %, more preferably at most 30 mass %, particularly preferably at most 20 mass %.

The proportion of the compound (2) to the total of the present compound, the compound (2), the compound (3) and the compound (4), is preferably at least 0 mass % and less than 40 mass %, more preferably from 0 to 30 mass %, particularly preferably from 0 to 20 mass %. The proportion of the compound (3) or the compound (4) is also the same as the proportion of the compound (2).

However, the total proportion of the compound (2), the compound (3) and the compound (4) to the total of the present compound, the compound (2), the compound (3) and the compound (4), is preferably more than 0 mass % and less than 40 mass %, particularly preferably more than 0 mass % and at most 30 mass %.

In a case where as other fluorinated ether compound, at least one member of the compound (2), the compound (3) and the compound (4) is contained, when the composition of the present composition is within the above range, the surface layer will be excellent in water/oil repellency, abrasion resistance, fingerprint stain removability, lubricity and outer appearance.

[Coating Liquid]

The coating liquid of the present invention (hereinafter referred to also as the present coating liquid) comprises the present compound or the present composition, and a liquid medium. The coating liquid may be any liquid and may be a solution or a dispersion.

The coating liquid may contain the present compound or the present composition and may contain impurities such as byproducts, etc. formed in the production process of the present compound.

The concentration of the present compound or the present composition is preferably from 0.001 to 10 mass %, particularly preferably from 0.1 to 1 mass %, in the present coating liquid.

The liquid medium is preferably an organic solvent. The organic solvent may be a fluorinated organic solvent, may be a non-fluorinated organic solvent, or may contain both solvents.

The fluorinated organic solvent may, for example, be a fluorinated alkane, a fluorinated aromatic compound, a fluoroalkyl ether, a fluorinated alkylamine, a fluoroalcohol, etc.

The fluorinated alkane is preferably a C$_{4-8}$ compound. Commercially available products may, for example, be C$_6$F$_{13}$H (manufactured by Asahi Glass Company, Limited, ASAHIKLIN (registered trademark) AC-2000), C$_6$F$_{13}$C$_2$H$_5$ (manufactured by Asahi Glass Company, Limited, ASAHIKLIN (registered trademark) AC-6000), C$_2$F$_5$CHFCHFCF$_3$ (manufactured by Chemours, Vertrel (registered trademark) XF), etc.

The fluorinated aromatic compound may, for example, be hexafluorobenzene, trifluoromethyl benzene, perfluorotoluene, bis(trifluoromethyl)benzene, etc.

The fluoroalkyl ether is preferably a compound having from 4 to 12 carbon atoms. Commercially available products may, for example, be CF$_3$CH$_2$OCF$_2$CF$_2$H (manufactured by Asahi Glass Company, Limited, ASAHIKLIN (registered trademark) AE-3000), C$_4$F$_9$OCH$_3$ (manufactured by 3M, Novec (registered trademark) 7100), C$_4$F$_9$OC$_2$H$_5$ (manufactured by 3M, Novec (registered trademark) 7200), C$_2$F$_5$CF(OCH$_3$)C$_3$F$_7$ (manufactured by 3M, Novec (registered trademark) 7300), etc.

The fluorinated alkylamine may, for example, be perfluorotripropylamine, perfluorotributylamine, etc.

The fluoroalcohol may, for example, be 2,2,3,3-tetrafluoropropanol, 2,2,2-trifluoroethanol, hexafluoroisopropanol, etc.

The non-fluorinated organic solvent is preferably a compound consisting of only hydrogen atoms and carbon atoms, or a compound consisting of only hydrogen atoms, carbon atoms and oxygen atoms, and may, for example, be a hydrocarbon-type solvent, an alcohol-type organic solvent, a ketone-type organic solvent, an ether-type organic solvent, or an ester-type organic solvent.

The present coating liquid contains the liquid medium in an amount of preferably from 90 to 99.999 mass %, particularly preferably from 99 to 99.9 mass %.

The present coating liquid may contain, in addition to the present compound and the liquid medium, other components within a range not impair the effects of the present invention.

Such other components may, for example, be known additives, such as an acid catalyst or a basic catalyst for promoting hydrolysis and condensation reaction of hydrolyzable silyl groups.

In the present coating liquid, the proportion of such other components is preferably at most 10 mass %, particularly preferably at most 1 mass %.

The solid content concentration in the present coating liquid is preferably from 0.001 to 10 mass %, particularly preferably from 0.01 to 1 mass %. The solid content concentration in the coating liquid is a value calculated from the mass of the coating liquid before heating, and the mass after heating at 120° C. for 4 hours in a convection dryer. Further, the concentration of the present composition can be calculated from the solid content concentration, and the charged amounts of the present composition and the solvent, etc.

[Article]

The article of the present invention has a surface layer formed of the present compound or the present composition at the surface of a substrate.

(Surface Layer)

In the present compound or the present composition, hydrolyzable silyl groups ($SiR^{13}_{n1}X^1_{3-n1}$) in the present compound undergo a hydrolysis reaction to form silanol groups (Si—OH), and such silanol groups are intermolecularly reacted to form Si—O—Si bonds, or such silanol groups undergo a dehydration condensation reaction with hydroxy groups (substrate-OH) at the surface of the substrate to form chemical bonds (substrate-O—Si). That is, the surface layer in the present invention contains the present compound in a state where some or all of hydrolyzable silyl groups in the present compound underwent the hydrolysis reaction.

The thickness of the surface layer is preferably from 1 to 100 nm, particularly preferably from 1 to 50 nm. When the thickness of the surface layer is at least the lower limit value in the above range, the effect by the surface treatment is likely to be sufficiently obtained. When the thickness of the surface layer is at most the upper limit value in the above range, utilization efficiency will be high. The thickness of the surface layer can be calculated from the oscillation period of the interference pattern of the reflected X-ray, by obtaining the interference pattern of the reflected X-ray by the X-ray reflectance method using the X-ray diffractometer for thin film analysis (manufactured by Rigaku Corporation, ATX-G).

(Substrate)

The substrate in the present invention is not particularly limited so long as it is a substrate which is desired to have water/oil repellency imparted. The material for the substrate may, for example, be a metal, a resin, glass, sapphire, ceramic, stone or a composite material thereof. The glass may have been chemically strengthened. The substrate may have its surface treated with e.g. $SiO_2$.

As the substrate, a substrate for a touch panel or a substrate for display is preferred, and a substrate for a touch panel is particularly preferred. The substrate for a touch panel has a light-transmitting property. "Having a light-transmitting property" means that the vertical incidence type visible light transmittance in accordance with JIS R3106: 1998 (ISO 9050: 1990) is at least 25%. As the material for a substrate for a touch panel, glass or a transparent resin is preferred.

(Method for Producing Article)

The article of the present invention may be produced, for example, by the following methods.

A method of treating the surface of a substrate by a dry coating method using the present compound or the present composition, to obtain the article of the present invention.

A method of applying the present coating liquid to the surface of a substrate by a wet coating method, followed by drying to obtain the article of the present invention.

<Dry Coating Method>

The present compound and the present composition may be used as it is in a dry coating method. The present compound and the present composition are suitable for forming a surface layer excellent in adhesion by a dry coating method. As the dry coating method, a method such as vacuum deposition, CVD or sputtering may be mentioned. With a view to suppressing the decomposition of the present compound and from the viewpoint of simplicity of apparatus, a vacuum deposition method may be suitably utilized.

<Wet Coating Method>

The wet coating method may, for example, be a spin coating method, a wipe coating method, a spray coating method, a squeegee coating method, a dip coating method, a die coating method, an ink-jet method, a flow coating method, a roll coating method, a casting method, a Langmuir-Blodgett method, a gravure coating method, etc.

<Post-Treatment>

In order to improve the abrasion resistance of the surface layer, as the case requires, an operation to accelerate the reaction between the present compound and the substrate may be carried out. Such an operation may, for example, be heating, humidification, light irradiation, etc. For example, by heating a substrate having a surface layer formed in an atmosphere having moisture, it is possible to accelerate a reaction such as a hydrolysis reaction of hydrolyzable silyl groups to silanol groups, a reaction of silanol groups with hydroxy groups at the surface of the substrate, a condensation reaction of silanol groups to form siloxane bonds, etc.

After the surface treatment, even if they are compounds in the surface layer, compounds not chemically bonded to other compounds or to the substrate may be removed as the case requires. As a specific method, for example, a method of letting a solvent flow on the surface layer, a method of wiping with a cloth soaked with solvent, etc. may be mentioned.

EXAMPLES

Now, the present invention will be described in more detail with reference to Examples, but the present invention is not limited to these Examples.

Hereinafter, "%" is "mass %" unless otherwise specified. Further, a mixture composed of at least two types of compound (1) will be referred to as a "compound", and one composed of compound (1) and other fluorinated ether compound will be referred to as a "composition".

Ex. 1 to 4, 11 to 14, 21 to 24, 26 to 29 and 31 to 33 are Examples of the present invention, and Ex. 5 to 10, 15 to 20, 25, 30, 34 and 35 are Comparative Examples.

Ex. 1: Production of Compound (1A-1) and Compound (3A-1)

Ex. 1-1

Into a 300 mL three-necked flask, 24.4 g of a 24% KOH aqueous solution, 33 g of tert-butyl alcohol and 220 g of compound (10-1) (manufactured by Solvay Solexis, Inc., FLUOROLINK (registered trademark) D4000) were put, and 19.4 g of $CF_3CF_2CF_2$—O—CF=$CF_2$ (manufactured by Tokyo Chemical Industry Co., Ltd.) was added. Under a nitrogen atmosphere, the mixture was stirred at 60° C. for 8 hours. It was washed once with dilute aqueous hydrochloric acid, whereupon the organic phase was collected and concentrated by an evaporator to obtain 233 g of crude product (a). The crude product (a) was developed and fractionated by silica gel column chromatography. As the developing solvents, $C_6F_{13}CH_2CH_3$ (manufactured by Asahi Glass Company, Limited, AC-6000), AC-6000/$CF_3CH_2OCF_2CF_2H$ (manufactured by Asahi Glass Company, Limited, AE-3000)=1/2 (mass ratio), and AE-3000/ethyl acetate=9/1 (mass ratio) were used in this order. With respect to each fraction, the structures of terminal groups, and the mean values of the unit numbers (x1, x2) of the structural units were obtained from the integral values of $^1$H-NMR and $^{19}$F-NMR. It was found that in the crude product (a), compound (11-1), compound (3A-1) and compound (10-1) were contained in amounts of 42 mol %, 49 mol % and 9 mol %, respectively. 98.6 g (yield: 44.8%) of the compound (11-1) and 51.9 g (yield: 23.6%) of the compound (3A-1) were obtained.

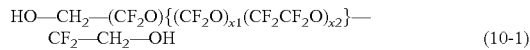
(10-1)

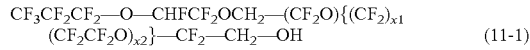
(11-1)

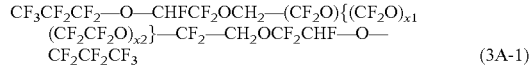
(3A-1)

NMR spectrum of compound (11-1);
$^1$H-NMR (300.4 MHz, solvent: CDCl$_3$, reference: TMS) δ (ppm): 3.9 (2H), 4.2 (2H), 5.8 to 6.0 (1H).
$^{19}$F-NMR (282.7 MHz, solvent: CDCl$_3$, reference: CFCl$_3$) δ (ppm): −52.4 to −55.8 (42F), −78.8 (1F), −80.8 (1F), −81.4 (1F), −82.2 (3F), −83.5 (1F), −85.3 to −88.2 (2F), −89.4 to −91.1 (82F), −130.5 (2F), −145.1 (1F).

Mean value of the unit number x1: 21, mean value of the unit number x2: 20, number average molecular weight of the compound (11-1): 4,150.

NMR spectrum of compound (3A-1);
$^1$H-NMR (300.4 MHz, solvent: CDCl$_3$, reference: TMS) δ (ppm): 4.2 (4H), 5.8 to 6.0 (2H).
$^{19}$F-NMR (282.7 MHz, solvent: CDCl$_3$, reference: CFCl$_3$) δ (ppm): −52.4 to −55.8 (42F), −78.8 (2F), −80.7 (2F), −82.2 (6F), −85.3 to −88.2 (4F), −89.4 to −91.1 (84F), −130.5 (4F), −145.1 (2F).

Mean value of the unit number x1: 21, mean value of the unit number x2: 20, number average molecular weight of the compound (3A-1): 4,420.

Ex. 1-2

Into a 100 mL eggplant flask, 30.0 g of the compound (11-1), 0.9 g of sodium fluoride powder and 30 g of dichloropentafluoropropane (manufactured by Asahi Glass Company, Limited, AK-225) were put, and 3.5 g of $CF_3CF_2CF_2OCF(CF_3)COF$ was added. Under a nitrogen atmosphere, the mixture was stirred at 50° C. for 24 hours. After removing sodium fluoride powder by a pressure filter, excess $CF_3CF_2CF_2OCF(CF_3)COF$ and AK-225 were distilled off under reduced pressure. The obtained crude product was diluted with $C_6F_{13}H$ (manufactured by Asahi Glass Company, Limited, AC-2000) and passed through a silica gel column, whereupon the collected solution was concentrated by an evaporator to obtain 31.8 g (yield: 98.8%) of compound (12-1).

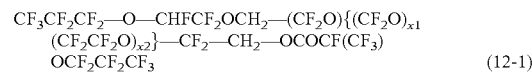
(12-1)

NMR spectrum of compound (12-1);
$^1$H-NMR (300.4 MHz, solvent: CDCl$_3$, reference: TMS) δ (ppm): 4.2 (2H), 4.7 (2H), 5.8 to 6.0 (1H).
$^{19}$F-NMR (282.7 MHz, solvent: CDCl$_3$, reference: CFCl$_3$) δ (ppm): −52.4 to −55.8 (42F), −78.8 to 88.2 (17F), −89.4 to −91.1 (82F), −130.3 (2F), −130.5 (2F), −132.5 (1F), −145.1 (1F).

Mean value of the unit number x1: 21, mean value of the unit number x2: 20, number average molecular weight of the compound (12-1): 4,460.

Ex. 1-3)

At a gas outlet of a 1 L nickel autoclave, a cooler maintained at 20° C., a NaF pellet packed layer and a cooler maintained at 0° C. were installed in series. A liquid returning line to return the solution collected from the cooler maintained at 0° C. to the autoclave was installed.

Into the autoclave, 750 g of $ClCF_2CFClCF_2OCF_2CF_2Cl$ (hereinafter referred to also as CFE-419) was put and stirred while maintaining the temperature at 25° C. Into the autoclave, nitrogen gas was blown at 25° C. for one hour, and then, 20% fluorine gas was blown at 25° C. for one hour at a flow rate of 2.0 L/hour. While blowing the 20% fluorine gas at the same flow rate into the autoclave, a solution prepared by dissolving 31.0 g of compound (12-1) in 124 g of CFE-419, was injected over a period of 4.3 hours. While blowing the 20% fluorine gas at the same flow rate, the internal pressure of the autoclave was raised to 0.15 MPa (gauge pressure). Into the autoclave, 4 mL of a benzene solution containing 0.05 g/mL of benzene in CFE-419, was injected while heating to 40° C. from 25° C., and then the benzene solution inlet of the autoclave was closed. After stirring for 15 minutes, 4 mL of the benzene solution was again injected while maintaining the temperature at 40° C., and then the inlet was closed. The same operation was repeated three more times. The total amount of benzene injected was 0.17 g. While blowing the 20% fluorine gas at the same flow rate, stirring was continued for 1 hour. The pressure in the autoclave was brought to atmospheric pressure, and nitrogen gas was blown in for 1 hour. The content of the autoclave was concentrated by an evaporator to obtain 31.1 g (yield: 98.5%) of compound (13-1).

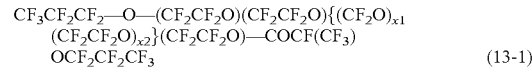
(13-1)

NMR spectrum of compound (13-1);
$^{19}$F-NMR (282.7 MHz, solvent: CDCl$_3$, reference: CFCl$_3$) δ (ppm): −52.4 to −55.7 (42F), −78.8 to −88.1 (11F), −89.4 to −91.1 (92F), −91.5 (2F), −130.3 (2F), −130.5 (2F), −132.5 (1F).

Mean value of the unit number x1: 21, mean value of the unit number x2: 20, number average molecular weight of the compound (13-1): 4,550.

Ex. 1-4

Into a round bottom flask made of a tetrafluoroethylene-perfluoro(alkoxy vinyl ether) copolymer (hereinafter referred to also as PFA), 30.0 g of the compound (13-1) and 60 g of AK-225 were put. The mixture was stirred while cooling in an ice bath, and under a nitrogen atmosphere, 2.0 g of methanol was slowly dropwise added from a dropping funnel. While bubbling with nitrogen, the mixture was stirred for 12 hours. The reaction mixture was concentrated by an evaporator to obtain 27.6 g (yield: 98.8%) of compound (14-1).

(14-1)

NMR spectrum of compound (14-1);
$^1$H-NMR (300.4 MHz, solvent: CDCl$_3$, reference: TMS) δ (ppm): 3.9 (3H).
$^{19}$F-NMR (282.7 MHz, solvent: CDCl$_3$, reference: CFCl$_3$) δ (ppm): −52.4 to −55.8 (42F), −82.2 (3F), −89.4 to −91.1 (92F), −130.5 (2F).

Mean value of the unit number x1: 21, mean value of the unit number x2: 20, number average molecular weight of the compound (14-1): 4,230.

Ex. 1-5

In a 100 mL three-necked eggplant flask, 0.18 g of lithium chloride was dissolved in 18.3 g of ethanol. 25.0 g of the compound (14-1) was added thereto, and while cooling in an ice bath, a solution prepared by dissolving 0.75 g of sodium borohydride in 22.5 g of ethanol, was slowly dropwise added. The ice bath was removed, and stirring was continued while slowly raising the temperature to room temperature. After stirring at room temperature for 12 hours, an aqueous hydrochloric acid solution was dropwise added until liquid became acidic. 20 mL of AC-2000 was added, followed by washing once with water and once with saturated brine, whereupon the organic phase was collected. The collected organic phase was concentrated by an evaporator to obtain 24.6 g (yield: 99.0%) of compound (15-1).

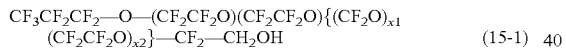
(15-1)

NMR spectrum of compound (15-1);
$^1$H-NMR (300.4 MHz, solvent: CDCl$_3$, reference: TMS) δ (ppm): 3.9 (2H).
$^{19}$F-NMR (282.7 MHz, solvent: CDCl$_3$, reference: CFCl$_3$) δ (ppm): −52.4 to −55.7 (42F), −81.4 (1F), −82.2 (3F), −83.4 (1F), −89.4 to −91.1 (90F), −130.5 (2F).

Mean value of the unit number x1: 21, mean value of the unit number x2: 20, number average molecular weight of the compound (15-1): 4,200.

Ex. 1-6

Into a 100 mL two-necked eggplant flask, 20.0 g of the compound (15-1), 20.0 g of 1,3-bis(trifluoromethyl)benzene (manufactured by Tokyo Chemical Industry Co., Ltd.), 1.01 g of CF$_3$SO$_2$Cl (manufactured by Wako Pure Chemical Industries, Ltd.) and 1.00 g of triethylamine were put and stirred at room temperature for 4 hours under a nitrogen atmosphere. After completion of the reaction, 15 g of AK-225 was added, followed by washing once with water and once with saturated brine, whereupon the organic phase was collected. The collected organic phase was concentrated by an evaporator to obtain 20.3 g (yield: 99%) of compound (16-1).

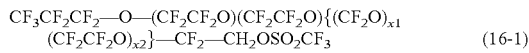
(16-1)

NMR spectrum of compound (16-1);
$^1$H-NMR (300.4 MHz, solvent: CDCl$_3$, reference: TMS) δ (ppm): 4.6 (2H).
$^{19}$F-NMR (282.7 MHz, solvent: CDCl$_3$, reference: CFCl$_3$) δ (ppm): −52.4 to −55.7 (42F), −74.1 (3F), −76.1 (1F), −79.5 (1F), −82.2 (3F), −89.4 to −91.1 (90F), −130.5 (2F).

Mean value of the unit number x1: 21, mean value of the unit number x2: 20, number average molecular weight of the compound (16-1): 4,340.

Ex. 1-7

Into a 50 mL eggplant flask, 15.0 g of the compound (16-1), 15.0 g of 1,3-bis(trifluoromethyl)benzene (manufactured by Tokyo Chemical Industry Co., Ltd.), 2.27 g of HN(CH$_2$CH=CH$_2$)$_2$ (manufactured by Tokyo Chemical Industry Co., Ltd.) and 0.68 g of triethylamine were put and stirred at 90° C. for 24 hours under a nitrogen atmosphere. After completion of the reaction, 15 g of AK-225 was added, followed by washing once with water and once with saturated brine, whereupon the organic phase was recovered and mixed with 1.5 g of silica gel, followed by filter filtration to recover the organic phase. The recovered organic phase was concentrated by an evaporator to obtain 14.4 g (yield: 98%) of compound (17-1).

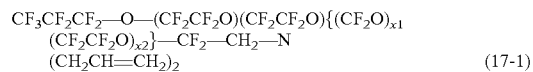
(17-1)

NMR spectrum of compound (17-1);
$^1$H-NMR (300.4 MHz, solvent: CDCl$_3$, reference: TMS) δ (ppm): 3.0 (2H), 3.2 (4H), 5.1 (4H), 5.8 (2H).
$^{19}$F-NMR (282.7 MHz, solvent: CDCl$_3$, reference: CFCl$_3$) δ (ppm): −52.4 to −55.7 (42F), −74.4 (1F), −76.6 (1F), −82.2 (3F), −89.4 to −91.1 (90F), −130.5 (2F).

Mean value of the unit number x1: 21, mean value of the unit number x2: 20, number average molecular weight of the compound (17-1): 4,280.

Ex. 1-8

Into a 100 mL PFA eggplant flask, 12.0 g of the compound (17-1), 0.03 g of a xylene solution (platinum content: 2%) of a platinum/1,3-divinyl-1,1,3,3-tetramethyldisiloxane complex, 1.3 g of HSi(OCH$_3$)$_3$, 0.01 g of dimethyl sulfoxide and 0.5 g of 1,3-bis(trifluoromethyl)benzene (manufactured by Tokyo Chemical Industry Co., Ltd.) were put and stirred at 40° C. for 10 hours. After completion of the reaction, the solvent, etc. were distilled off under reduced pressure, followed by filtration through a membrane filter having a pore size of 0.2 μm, to obtain 11.9 g (yield: 92%) of a composition (1) comprising compound (1A-1) wherein two allyl groups in the compound (17-1) were hydrosilylated and a byproduct formed by intermolecular-cyclization of two allyl groups in the compound (17-1). The conversion in the hydrosilylation was 100%, and no compound (17-1) remained. The selectivity in the hydrosilylation was 81%.

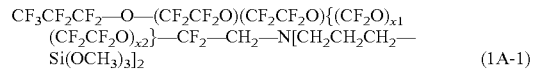
(1A-1)

NMR spectrum of compound (1A-1);
$^1$H-NMR (300.4 MHz, solvent: CDCl$_3$, reference: TMS) δ (ppm): 0.7 (4H), 1.6 (4H), 2.6 (4H), 3.1 (2H), 3.6 (18H).
$^{19}$F-NMR (282.7 MHz, solvent: CDCl$_3$, reference: CFCl$_3$) δ (ppm): −52.4 to −55.7 (42F), −74.4 (1F), −76.6 (1F), −82.2 (3F), −89.4 to −91.1 (90F), −130.5 (2F).

Mean value of the unit number x1: 21, mean value of the unit number x2: 20, number average molecular weight of the compound (1A-1): 4,530.

Ex. 2: Production of Compound (1B-1)

Ex. 2-1

30.0 g (yield: 99%) of compound (16B-1) was obtained in the same manner as in Ex. 1-6 except that the compound (15-1) was changed to 30.0 g of the compound (11-1) obtained in Ex. 1-1, the amount of 1,3-bis(trifluoromethyl)benzene (manufactured by Tokyo Chemical Industry Co., Ltd.) was changed to 30.0 g, the amount of $CF_3SO_2Cl$ (manufactured by Wako Pure Chemical Industries, Ltd.) was changed to 1.44 g, and the amount of triethylamine was changed to 1.45 g.

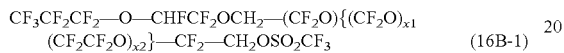
(16B-1)

NMR spectrum of compound (16B-1);
$^1$H-NMR (300.4 MHz, solvent: $CDCl_3$, reference: TMS) δ (ppm): 4.2 (2H), 4.6 (2H), 5.8 to 6.0 (1H).
$^{19}$F-NMR (282.7 MHz, solvent: $CDCl_3$, reference: $C_6F_6$) δ (ppm): −51.2 to −54.6 (42F), −74.1 (3F), −77.6 (1F), −77.6 (2F), −79.0 (1F), −79.5 (1F), −81.2 (3F), −84.3 to −87.2 (2F), −87.9 to −91.0 (82F), −129.4 (2F), −144.1 (1F).

Mean value of the unit number x1: 21, mean value of the unit number x2: 20, number average molecular weight of the compound (16B-1): 4,280.

Ex. 2-2

14.1 g (yield: 95%) of compound (17B-1) was obtained in the same manner as in Ex. 1-7 except that the compound (16-1) was changed to the compound (16B-1), the amount of $HN(CH_2CH=CH_2)_2$ was changed to 2.31 g, the amount of triethylamine was changed to 0.69 g, and the reaction time was changed to 16 hours.

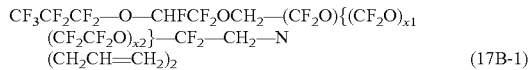
(17B-1)

NMR spectrum of compound (17B-1);
$^1$H-NMR (300.4 MHz, solvent: $CDCl_3$, reference: TMS) δ (ppm): 3.0 (2H), 3.2 (4H), 4.2 (2H), 5.1 (4H), 5.7 to 6.0 (3H).
$^{19}$F-NMR (282.7 MHz, solvent: $CDCl_3$, reference: $C_6F_6$) δ (ppm): −51.2 to −54.6 (42F), −73.4 (1F), −75.6 (1F), −77.7 (1F), −79.7 (1F), −81.2 (3F), −84.3 to −87.2 (2F), −87.9 to −91.0 (82F), −129.4 (2F), −144.1 (1F).

Mean value of the unit number x1: 21, mean value of the unit number x2: 20, number average molecular weight of the compound (17B-1): 4,230.

Ex. 2-3

In the same manner as in Ex. 1-8 except that the compound (17-1) was changed to the compound (17B-1) obtained in Ex. 2-2, the amount of the platinum complex solution was changed to 0.032 g and the reaction temperature was changed to 70° C., 11.7 g (yield: 92%) of a composition (2) comprising compound (1B-1) wherein two allyl groups in the compound (17B-1) were hydrosilylated, and a byproduct formed by intermolecular-cyclization of two allyl groups in the compound (17B-1), was obtained.

The conversion in the hydrosilylation was 100%, and no compound (17B-1) remained. The selectivity in the hydrosilylation was 82%.

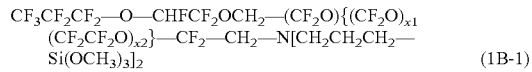
(1B-1)

NMR spectrum of compound (1B-1);
$^1$H-NMR (300.4 MHz, solvent: $CDCl_3$, reference: TMS) δ (ppm): 0.7 (4H), 1.6 (4H), 2.6 (4H), 3.1 (2H), 3.6 (18H), 4.2 (2H), 5.8 to 6.0 (1H).
$^{19}$F-NMR (282.7 MHz, solvent: $CDCl_3$, reference: $C_6F_6$) δ (ppm): −51.2 to −54.6 (42F), −73.4 (1F), −75.6 (1F), −77.7 (1F), −79.7 (1F), −81.2 (3F), −84.3 to −87.2 (2F), −87.9 to −91.0 (82F), −129.4 (2F), −144.1 (1F).

Mean value of the unit number x1: 21, mean value of the unit number x2: 20, number average molecular weight of the compound (1B-1): 4,470.

Ex. 3: Production of Compound (1C-1)

Ex. 3-1

In accordance with the method described in Example 7 of WO2013/121984, compound (15C-1) was obtained.

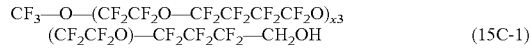
(15C-1)

NMR spectrum of compound (15C-1);
$^1$H-NMR (300.4 MHz, solvent: $CDCl_3$, reference: TMS) δ (ppm): 2.0 (1H), 4.0 (2H).
$^{19}$F-NMR (282.7 MHz, solvent: $CDCl_3$, reference: $CFCl_3$) δ (ppm): −56.2 (3F), −84.1 (54F), −89.3 (54F), −91.4 (2F), −123.7 (2F), −126.6 (52F), −128.7 (2F).

Mean value of the unit number x3: 13, number average molecular weight of the compound (15C-1): 4,700.

Ex. 3-2

30.6 g (yield: 99%) of compound (16C-1) was obtained in the same manner as in Ex. 1-6 except that the compound (15-1) was changed to the compound (15C-1) obtained in Ex. 3-1, the amount of $CF_3SO_2Cl$ (manufactured by Wako Pure Chemical Industries, Ltd.) was changed to 0.86 g, and the amount of triethylamine was changed to 1.02 g.

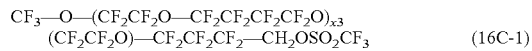
(16C-1)

NMR spectrum of compound (16C-1);
$^1$H-NMR (300.4 MHz, solvent: $CDCl_3$, reference: TMS) δ (ppm): 4.7 (2H).
$^{19}$F-NMR (282.7 MHz, solvent: $CDCl_3$, reference: $C_6F_6$) δ (ppm): −56.3 (3F), −74.0 (3F), −84.0 (54F), −89.2 (54F), −91.4 (2F), −122.7 (2F), −123.6 (2F), −126.6 (52F).

Mean value of the unit number x3: 13, number average molecular weight of the compound (16C-1): 4,830.

Ex. 3-3

14.6 g (yield: 98%) of compound (17C-1) was obtained in the same manner as in Ex. 1-7 except that the compound (16-1) was changed to the compound (16C-1) obtained in Ex. 3-2, the amount of $HN(CH_2CH=CH_2)_2$ was changed to 2.08 g, and the amount of triethylamine was changed to 0.63 g.

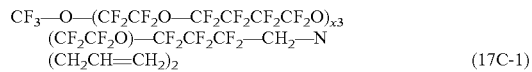
(17C-1)

NMR spectrum of compound (17C-1);
$^1$H-NMR (300.4 MHz, solvent: CDCl$_3$, reference: TMS) δ (ppm): 3.1 (2H), 3.2 (4H), 5.1 (4H), 5.8 (2H).
$^{19}$F-NMR (282.7 MHz, solvent: CDCl$_3$, reference: C$_6$F$_6$) δ (ppm): −56.3 (3F), −84.0 (54F), −89.2 (54F), −91.4 (2F), −120.9 (2F), −126.6 (54F).

Mean value of the unit number x3: 13, number average molecular weight of the compound (17C-1): 4,780.

Ex. 3-4

In the same manner as in Ex. 1-8 except that the compound (17-1) was changed to the compound (17C-1) obtained in Ex. 3-3, the amount of the platinum complex solution was changed to 0.029 g and the amount of HSi(OCH$_3$)$_3$ was changed to 1.2 g, 11.8 g (yield: 94%) of a composition (3) comprising compound (1C-1) wherein two allyl groups in the compound (17C-1) were hydrosilylated, and a byproduct formed by intermolecular cyclization of two allyl groups in the compound (17C-1), was obtained. The conversion in the hydrosilylation was 100%, and no compound (17C-1) remained. The selectivity in the hydrosilylation was 80%.

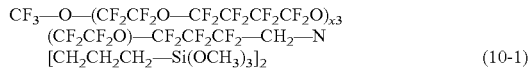

(10-1)

NMR spectrum of compound (1C-1);
$^1$H-NMR (300.4 MHz, solvent: CDCl$_3$, reference: TMS) δ (ppm): 0.7 (4H), 1.6 (4H), 2.6 (4H), 3.2 (2H), 3.6 (18H).
$^{19}$F-NMR (282.7 MHz, solvent: CDCl$_3$, reference: C$_6$F$_6$) δ (ppm): −56.3 (3F), −84.0 (54F), −89.2 (54F), −91.4 (2F), −120.9 (2F), −126.6 (54F).

Mean value of the unit number x3: 13, number average molecular weight of the compound (1C-1): 5,020.

Ex. 4: Production of Compound (1C-2)

Ex. 4-1

21.5 g (yield: 98%) of compound (16C-2) was obtained in the same manner as in Ex. 1-6 except that the compound (15-1) was changed to compound (15C-2) (manufactured by SynQuest Laboratories), the amount of CF$_3$SO$_2$Cl (manufactured by Wako Pure Chemical Industries, Ltd.) was changed to 4.0 g, and the amount of triethylamine was changed to 4.5 g.

CF$_3$CF$_2$CF$_2$—O—(CF(CF$_3$)CF$_2$O)$_{x4}$—CF(CF$_3$)—
CH$_2$OH    (15C-2)

CF$_3$CF$_2$CF$_2$—O—(CF(CF$_3$)CF$_2$O)$_{x4}$—CF(CF$_3$)—
CH$_2$OSO$_2$CF$_3$    (16C-2)

NMR spectrum of compound (16C-2);
$^1$H-NMR (300.4 MHz, solvent: CDCl$_3$, reference: TMS) δ (ppm): 4.9 (2H).
$^{19}$F-NMR (282.7 MHz, solvent: CDCl$_3$, reference: C$_6$F$_6$) δ (ppm): −74.2 (3F), −78.4 to −82.2 (38F), −129.4 (2F), −135.0 (1F), −144.2 (6F).

Mean value of the unit number x4: 6, number average molecular weight of the compound (16C-2): 1,440.

Ex. 4-2

9.5 g (yield: 98%) of compound (17C-2) was obtained in the same manner as in Ex. 1-7 except that the compound (16-1) was changed to 10.0 g of the compound (16C-2) obtained in Ex. 4-1, the amount of 1,3-bis(trifluoromethyl)benzene (manufactured by Tokyo Chemical Industry Co., Ltd.) was changed to 10.0 g, the amount of HN(CH$_2$CH=CH$_2$)$_2$ was changed to 2.67 g, the amount of triethylamine was changed to 4.07 g, the amount of AK-225 was changed to 10 g and the amount of silica gel was changed to 1.0 g.

CF$_3$CF$_2$CF$_2$—O—(CF(CF$_3$)CF$_2$O)$_{x4}$—CF(CF$_3$)—
CH$_2$—N(CH$_2$CH=CH$_2$)$_2$    (17C-2)

NMR spectrum of compound (17C-2);
$^1$H-NMR (300.4 MHz, solvent: CDCl$_3$, reference: TMS) δ (ppm): 3.2 (6H), 5.1 (4H), 5.8 (2H).
$^{19}$F-NMR (282.7 MHz, solvent: CDCl$_3$, reference: C$_6$F$_6$) δ (ppm): 78.4 to −82.2 (38F), −129.4 (2F), −131.1 (1F), −144.2 (6F).

Mean value of the unit number x4: 6, number average molecular weight of the compound (17C-2): 1,390.

Ex. 4-3

In the same manner as in Ex. 1-8 except that the compound (17-1) was changed to 8.0 g of the compound (17C-2) obtained in Ex. 4-2, the amount of the platinum complex solution was changed to 0.09 g, the amount of HSi(OCH$_3$)$_3$ was changed to 3.2 g, the amount of dimethyl sulfoxide was changed to 0.03 g, and the amount of 1,3-bis(trifluoromethyl)benzene (manufactured by Tokyo Chemical Industry Co., Ltd.) was changed to 1.6 g, 9.0 g (yield: 96%) of a composition (4) comprising compound (1C-2) wherein two allyl groups in the compound (17C-2) were hydrosilylated and a byproduct formed by intermolecular cyclization of two allyl groups in the compound (17C-2), was obtained. The conversion in the hydrosilylation was 100%, and no compound (17C-2) remained. The selectivity in the hydrosilylation was 82%.

CF$_3$CF$_2$CF$_2$—O—(CF(CF$_3$)CF$_2$O)$_{x4}$—CF(CF$_3$)—
CH$_2$—N[CH$_2$CH$_2$CH$_2$Si(OCH$_3$)$_3$]$_2$    (1C-2)

NMR spectrum of compound (1C-2);
$^1$H-NMR (300.4 MHz, solvent: CDCl$_3$, reference: TMS) δ (ppm): 0.7 (4H), 1.6 (4H), 2.6 (4H), 3.3 (2H), 3.6 (18H).
$^{19}$F-NMR (282.7 MHz, solvent: CDCl$_3$, reference: C$_6$F$_6$) δ (ppm): −78.4 to −82.2 (38F), −129.4 (2F), −131.1 (1F), −144.2 (6F).

Mean value of the unit number x4: 6, number average molecular weight of the compound (1C-2): 1,640.

Ex. 5: Production of Compound (4-1)

Ex. 5-1

In accordance with the method described in Example 6 of WO2013/121984, compound (14-2) was obtained.

CF$_3$—O—(CF$_2$CF$_2$O—CF$_2$CF$_2$CF$_2$O)$_{x3}$
(CF$_2$CF$_2$O)—CF$_2$CF$_2$CF$_2$—COOCH$_3$    (14-2)

NMR spectrum of compound (14-2);
$^1$H-NMR (300.4 MHz, solvent: CDCl$_3$, reference: TMS) δ (ppm): 3.9 (3H).
$^{19}$F-NMR (282.7 MHz, solvent: CDCl$_3$, reference: CFCl$_3$) δ (ppm): −56.2 (3F), −84.0 (54F), −89.3 (54F), −91.4 (2F), −119.8 (2F), −126.6 (52F), −127.0 (2F).

Mean value of the unit number x3: 13, number average molecular weight of the compound (14-2): 4,730.

Ex. 5-2

Using the compound (14-2), in accordance with the method described in U.S. Patent Application Publication No.

2005/0249942, paragraphs [0100] to [0104], compound (21-1) was obtained, and then, compound (22-1) was obtained.

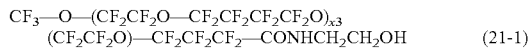

CF$_3$—O—(CF$_2$CF$_2$O—CF$_2$CF$_2$CF$_2$CF$_2$O)$_{x3}$
(CF$_2$CF$_2$O)—CF$_2$CF$_2$CF$_2$—CONHCH$_2$CH$_2$OH    (21-1)

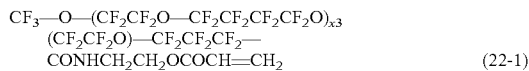

CF$_3$—O—(CF$_2$CF$_2$O—CF$_2$CF$_2$CF$_2$CF$_2$O)$_{x3}$
(CF$_2$CF$_2$O)—CF$_2$CF$_2$CF$_2$—
CONHCH$_2$CH$_2$OCOCH=CH$_2$    (22-1)

Ex. 5-3

Using the compound (22-1), compound (4-1) was obtained in accordance with the method described in paragraph [0121] of Patent Document 1.

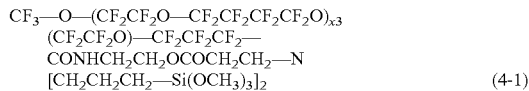

CF$_3$—O—(CF$_2$CF$_2$O—CF$_2$CF$_2$CF$_2$CF$_2$O)$_{x3}$
(CF$_2$CF$_2$O)—CF$_2$CF$_2$CF$_2$—
CONHCH$_2$CH$_2$OCOCH$_2$CH$_2$—N
[CH$_2$CH$_2$CH$_2$—Si(OCH$_3$)$_3$]$_2$    (4-1)

NMR spectrum of compound (4-1);
$^1$H-NMR (300.4 MHz, solvent: CDCl$_3$, reference: TMS) δ (ppm): 0.7 (4H), 1.6 (4H), 2.4 to 2.9 (10H), 3.6 (18H), 4.4 (2H).
$^{19}$F-NMR (282.7 MHz, solvent: CDCl$_3$, reference: CFCl$_3$) δ (ppm): −56.2 (3F), −84.0 (54F), −89.3 (54F), −91.4 (2F), −120.8 (2F), −126.6 (52F), −127.2 (2F).
Mean value of the unit number x3: 13, number average molecular weight of the compound (4-1): 5,150.

Ex. 6: Production of Compound (4-2)

Ex. 6-1

Compound (4-2) was obtained in the same manner as in Ex. 5 except that the compound (14-2) was changed to compound (14-3) (manufactured by Shin Quest Laboratories).

CF$_3$CF$_2$CF$_2$—O—(CF(CF$_3$)CF$_2$O)$_{x4}$—CF(CF$_3$)—
COOCH$_3$    (14-3)

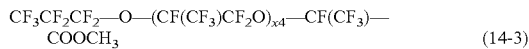

CF$_3$CF$_2$CF$_2$—O—(CF(CF$_3$)CF$_2$O)$_{x4}$—CF(CF$_3$)—
CONHCH$_2$CH$_2$OCOCH$_2$CH$_2$—N
[CH$_2$CH$_2$CH$_2$—Si(OCH$_3$)$_3$]$_2$

NMR spectrum of compound (4-2);
$^1$H-NMR (300.4 MHz, solvent: CDCl$_3$, reference: TMS) δ (ppm): 0.7 (4H), 1.6 (4H), 2.4 to 2.9 (10H), 3.6 (18H), 4.5 (2H).
$^{19}$F-NMR (282.7 MHz, solvent: CDCl$_3$, reference: CFCl$_3$) δ (ppm): −78.4 to −82.2 (38F), −129.4 (2F), −131.1 (1F), −144.2 (6F).
Mean value of the unit number x4: 6, number average molecular weight of the compound (4-2): 1,760.

Ex. 7: Production of Compound (2A-1)

Ex. 7-1

31.0 g (yield: 97%) of compound (18-1) was obtained in the same manner as in Ex. 1-6 except that the compound (15-1) was changed to 30.0 g of the compound (10-1), the amount of 1,3-bis(trifluoromethyl)benzene (manufactured by Tokyo Chemical Industry Co., Ltd.) was changed to 30.0 g, the amount of CF$_3$SO$_2$Cl (manufactured by Wako Pure Chemical Industries, Ltd.) was changed to 2.9 g, and the amount of triethylamine was changed to 3.0 g.

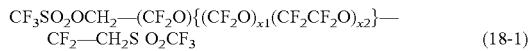

CF$_3$SO$_2$OCH$_2$—(CF$_2$O){(CF$_2$O)$_{x1}$(CF$_2$CF$_2$O)$_{x2}$}—
CF$_2$—CH$_2$SO$_2$CF$_3$    (18-1)

NMR spectrum of compound (18-1);
$^1$H-NMR (300.4 MHz, solvent: CDCl$_3$, reference: TMS) δ (ppm): 4.6 (2H).
$^{19}$F-NMR (282.7 MHz, solvent: CDCl$_3$, reference: C$_6$F$_6$) δ (ppm): −51.2 to −54.6 (42F), −74.1 (6F), −77.0 (2F), −79.0 (2F), −87.5 to −91.0 (80F).
Mean value of the unit number x1: 21, mean value of the unit number x2: 20, number average molecular weight of the compound (18-1): 4,150.

Ex. 7-2

23.1 g (yield: 95%) of compound (19-1) was obtained in the same manner as in Ex. 1-7 except that the compound (16-1) was changed to 25.0 g of the compound (18-1) obtained in Ex. 7-1, the amount of 1,3-bis(trifluoromethyl)benzene (manufactured by Tokyo Chemical Industry Co., Ltd.) was changed to 25.0 g, the amount of HN(CH$_2$CH=CH$_2$)$_2$ was changed to 4.68 g, the amount of triethylamine was changed to 4.88 g, the amount of AK-225 was changed to 25 g, and the amount of silica gel was changed to 2.5 g.

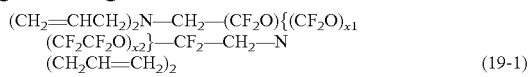

(CH$_2$=CHCH$_2$)$_2$N—CH$_2$—(CF$_2$O){(CF$_2$O)$_{x1}$
(CF$_2$CF$_2$O)$_{x2}$}—CF$_2$—CH$_2$—N
(CH$_2$CH=CH$_2$)$_2$    (19-1)

NMR spectrum of compound (19-1);
$^1$H-NMR (300.4 MHz, solvent: CDCl$_3$, reference: TMS) δ (ppm): 3.0 (4H), 3.2 (8H), 5.1 (8H), 5.8 (4H).
$^{19}$F-NMR (282.7 MHz, solvent: CDCl$_3$, reference: C$_6$F$_6$) δ (ppm): −51.2 to −54.6 (42F), −77.0 (2F), −79.0 (2F), −87.5 to −91.0 (80F).
Mean value of the unit number x1: 21, mean value of the unit number x2: 20, number average molecular weight of the compound (19-1): 4,050.

Ex. 7-3

In the same manner as in Ex. 1-8 except that the compound (17-1) was changed to 20.0 of the compound (19-1) obtained in Ex. 7-2, the amount of the platinum complex solution was changed to 0.1 g, the amount of HSi(OCH$_3$)$_3$ was changed to 4.8 g, the amount of dimethyl sulfoxide was changed to 0.02 g, and the amount of 1,3-bis(trifluoromethyl)benzene (manufactured by Tokyo Chemical Industry Co., Ltd.) was changed to 0.8 g, 21.3 g (yield: 95%) of a composition (7) comprising compound (2A-1) wherein four allyl groups in the compound (19-1) were hydrosilylated and a byproduct formed by intermolecular cyclization of two allyl groups in the compound (19-1), was obtained. The conversion in the hydrosilylation was 100%, and no compound (19-1) remained. The selectivity in the hydrosilylation was 81%.

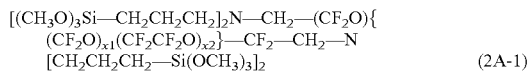

[(CH$_3$O)$_3$Si—CH$_2$CH$_2$CH$_2$]$_2$N—CH$_2$—(CF$_2$O){
(CF$_2$O)$_{x1}$(CF$_2$CF$_2$O)$_{x2}$}—CF$_2$—CH$_2$—N
[CH$_2$CH$_2$CH$_2$—Si(OCH$_3$)$_3$]$_2$    (2A-1)

NMR spectrum of compound (2A-1);
$^1$H-NMR (300.4 MHz, solvent: CDCl$_3$, reference: TMS) δ (ppm): 0.7 (8H), 1.6 (8H), 2.6 (8H), 3.0 (4H), 3.6 (36H).
$^{19}$F-NMR (282.7 MHz, solvent: CDCl$_3$, reference: C$_6$F$_6$) δ (ppm): −51.2 to −54.6 (42F), −77.0 (2F), −79.0 (2F), −87.5 to −91.0 (80F).

Ex. 8: Production of Compound (5-1)

Ex. 8-1

Into a 100 mL two-necked eggplant flask, 20.0 g of the compound (15-1) obtained in Ex. 1-5, 0.21 g of tetrabutylammonium bisulfate, 1.76 g of BrCH$_2$CH=CH$_2$ and 2.6 g of a 30% sodium hydroxide aqueous solution were added and stirred at 60° C. for 8 hours. After completion of the reaction, 20 g of AC-2000 was added, followed by washing once with dilute aqueous hydrochloric acid, whereupon the organic phase was collected. The collected organic phase was passed through a silica gel column, and the recovered solution was concentrated by an evaporator to obtain 19.8 g (yield: 98.2%) of compound (24-1).

(24-1)

NMR spectrum of compound (24-1);
$^1$H-NMR (300.4 MHz, solvent: CDCl$_3$, reference: TMS) δ (ppm): 3.7 (2H), 4.1 (2H), 5.2 to 5.3 (2H), 5.9 (1H).
$^{19}$F-NMR (282.7 MHz, solvent: CDCl$_3$, reference: CFCl$_3$) δ (ppm): −52.3 to −55.7 (42F), −78.1 (1F), −80.1 (1F), −82.1 (3F), −89.4 to −91.1 (90F), −130.5 (2F).

Mean value of the unit number x1: 21, mean value of the unit number x2: 20, number average molecular weight of the compound (24-1): 4,250.

Ex. 8-2

In the same manner as in Ex. 1-8 except that the compound (17-1) was changed to 5.0 g of the compound (24-1) obtained in Ex. 8-1, the amount of the platinum complex solution was changed to 0.005 g, the amount of HSi(OCH$_3$)$_3$ was changed to 0.25 g, the amount of dimethyl sulfoxide was changed to 0.005 g, the amount of 1,3-bis (trifluoromethyl)benzene (manufactured by Tokyo Chemical Industry Co., Ltd.) was changed to 0.20 g, and the reaction time was changed to 4 hours, 4.9 g (yield: 95%) of a composition (8) comprising compound (5-1) wherein one allyl group in the compound (24-1) was hydrosilylated and a byproduct wherein one allyl group in the compound (24-1) was isomerized to an inner olefin (—CH=CHCH$_3$), was obtained. The conversion in the hydrosilylation was 100%, and no compound (24-1) remained. The selectivity in the hydrosilylation was 95%.

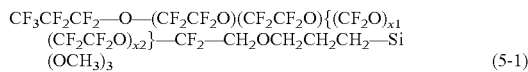

(5-1)

NMR spectrum of compound (5-1);
$^1$H-NMR (300.4 MHz, solvent: CDCl$_3$, reference: TMS) δ (ppm): 0.7 (6H), 1.7 (6H), 3.6 (11H), 3.8 (2H).
$^{19}$F-NMR (282.7 MHz, solvent: CDCl$_3$, reference: C$_6$F$_6$) δ (ppm): −52.4 to −55.8 (42F), −78.2 (1F), −80.2 (1F), −82.2 (3F), −89.4 to −91.1 (90F), −130.5 (2F).

Mean value of the unit number x1: 21, mean value of the unit number x2: 20, number average molecular weight of the compound (5-1): 4,370.

Ex. 9: Production of Compound (5-2)

Ex. 9-1

52.4 g (yield: 99.9%) of compound (24-2) was obtained in the same manner as in Ex. 8-1 except that the compound (15-1) was changed to 52.0 g of the compound (11-1) obtained in Ex. 1-1, the amount of tetrabutylammonium hydrogen sulfate was changed to 0.52 g, the amount of BrCH$_2$CH=CH$_2$ was changed to 4.4 g, the amount of the 30% sodium hydroxide aqueous solution was changed to 6.5 g, and the amount of AC-2000 was changed to 50 g.

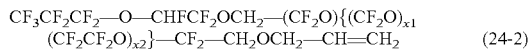

(24-2)

NMR spectrum of compound (24-2);
$^1$H-NMR (300.4 MHz, solvent: CDCl$_3$, reference: TMS) δ (ppm): 3.7 (2H), 4.1 (2H), 4.2 (2H), 5.2 to 5.3 (2H), 5.8 to 6.0 (2H).
$^{19}$F-NMR (282.7 MHz, solvent: CDCl$_3$, reference: CFCl$_3$) δ (ppm): −52.3 to −55.7 (42F), −78.1 (1F), −78.7 (1F), −80.2 (1F), −80.7 (1F), −82.2 (3F), −85.4 to −88.2 (2F), −89.4 to −91.1 (86F), −130.5 (2F), −145.1 (1F).

Mean value of the unit number x1: 21, mean value of the unit number x2: 20, number average molecular weight of the compound (24-2): 4,190.

Ex. 9-2

In the same manner as in Ex. 8-2 except that the compound (24-1) was changed to the compound (24-2) obtained in Ex. 9-1, 4.8 g (yield: 93%) of a composition (9) comprising compound (5-2) wherein one allyl group in the compound (24-2) was hydrosilylated and a byproduct wherein one allyl group in the compound (24-2) was isomerized to an inner olefin (—CH=CHCH$_3$), was obtained. The conversion in the hydrosilylation was 100%, and no compound (24-2) remained. The selectivity in the hydrosilylation was 94%.

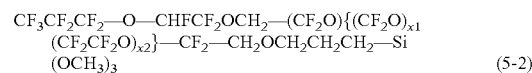

(5-2)

NMR spectrum of compound (5-2);
$^1$H-NMR (300.4 MHz, solvent: CDCl$_3$, reference: TMS) δ (ppm): 0.7 (6H), 1.7 (6H), 3.6 (11H), 3.8 (2H), 4.2 (2H), 5.8 to 6.0 (1H).
$^{19}$F-NMR (282.7 MHz, solvent: CDCl$_3$, reference: C$_6$F$_6$) δ (ppm): −52.3 to −55.7 (42F), −78.2 (1F), −78.7 (1F), −80.3 (1F), −80.7 (1F), −82.2 (3F), −85.4 to −88.2 (2F), −89.4 to −91.1 (82F), −130.5 (2F), −145.1 (1F).

Mean value of the unit number x1: 21, mean value of the unit number x2: 20, number average molecular weight of the compound (5-2): 4,310.

Ex. 10: Production of Compound (6-1)

In accordance with the method described in Example 6 of WO2013/121984, compound (6-1) was obtained.

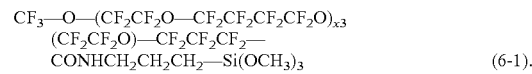

(6-1).

NMR spectrum of compound (6-1);
$^1$H-NMR (300.4 MHz, solvent: CDCl$_3$, reference: TMS) δ (ppm): 0.6 (2H), 1.6 (2H), 2.8 (1H), 3.3 (2H), 3.5 (9H).
$^{19}$F-NMR (282.7 MHz, solvent: CDCl$_3$, reference: CFCl$_3$) δ (ppm): −56.2 (3F), −84.1 (54F), −89.3 (54F), −91.3 (2F), −120.8 (2F), −126.6 (52F), −127.2 (2F).

Mean value of the unit number x3: 13, number average molecular weight of the compound (6-1): 4,870.

Ex. 11 to 20: Production and Evaluation of Articles

Using the compound or composition obtained in each of Ex. 1 to 10, surface treatment of a substrate was conducted to obtain an article in each of Ex. 11 to 20. As the surface treatment method, in each Ex., the following dry coating and wet coating method were, respectively, employed. As the substrate, chemically strengthened glass was used. With respect to the obtained article, evaluations were carried out by the following methods. The results are shown in Tables 1 and 2.

(Dry Coating Method)

The dry coating was carried out by using a vacuum vapor deposition apparatus (manufactured by ULVAC Co., VTR-350M) (vacuum vapor deposition method). 0.5 g of the compound or composition obtained in each of Ex. 1 to 10 was filled in a boat made of molybdenum in the vacuum vapor deposition apparatus, and inside of the vacuum vapor deposition apparatus was evacuated to a level of at most $1 \times 10^{-3}$ Pa. The boat having the composition placed therein, was heated at a temperature raising rate of at most 10° C./min, and at the time when the vapor deposition rate by a quartz oscillator film thickness meter exceeded 1 nm/sec, the shutter was opened to initiate film deposition on the surface of a substrate. When the film thickness became about 50 nm, the shutter was closed to terminate film deposition on the surface of the substrate. The substrate to which the composition was deposited, was subjected to heat treatment at 200° C. for 30 minutes, followed by washing with AK-225, to obtain an article having a surface treated layer on the surface of the substrate.

(Wet Coating Method)

The compound or composition obtained in each of Ex. 1 to 10, and $C_4F_9OC_2H_5$ (manufactured by 3M, Novec™ 7200) as a liquid medium, were mixed to prepare a coating liquid having a solid content concentration of 0.05%. A substrate was dipped in the coating liquid and allowed to stand for 30 minutes, whereupon the substrate was taken out (dip coating method). The coating film was dried at 200° C. for 30 minutes, followed by washing with AK-225, to obtain an article having a surface treated layer on the surface of the substrate.

(Evaluation Methods)

<Method for Measuring Contact Angle>

The contact angle of about 2 µL of distilled water or n-hexadecane placed on the surface of the surface layer, was measured by using a contact angle measuring apparatus (manufactured by Kyowa Interface Science Co., Ltd., DM-500). Measurements were conducted at five different points on the surface of the surface layer, and the average value was calculated. For the calculation of the contact angle, a 2θ method was employed.

<Initial Contact Angle>

With respect to the surface layer, the initial water contact angle and the initial n-hexadecane contact angle were measured by the above-described measuring method. The evaluation standards are as follows.

Initial water contact angle:

⊚ (excellent): at least 115 degrees.

○ (good): at least 110 degrees and less than 115 degrees.

Δ (acceptable): at least 100 degrees and less than 110 degrees.

x (poor): less than 100 degrees.

Initial n-hexadecane contact angle:

⊚ (excellent): at least 66 degrees.

○ (good): at least 65 degrees and less than 66 degrees.

Δ (acceptable): at least 63 degrees and less than 65 degrees.

x (poor): less than 63 degrees.

<Abrasion Resistance>

With respect to the surface layer, in accordance with JIS L0849: 2013 (ISO 105-X12: 2001), using a reciprocating traverse testing machine (manufactured by KNT Co.), steel wool Bon Star (#0000) was reciprocated 10,000 times under a pressure of 98.07 kPa at a speed of 320 cm/min, whereupon the water contact angle was measured. The smaller the decrease in water repellency (water contact angle) after the abrasion, the smaller the decrease in performance due to friction, and the better the abrasion resistance. The evaluation standards are as follows.

⊚ (excellent): The change in water contact angle after reciprocation of 10,000 times is at most 5 degrees.

○ (good): The change in water contact angle after reciprocation of 10,000 times is more than 5 degrees and at most 10 degrees.

Δ (acceptable): The change in water contact angle after reciprocation of 10,000 times is more than 10 degrees and at most 20 degrees.

x (poor): The change in water contact angle after reciprocation of 10,000 times is more than 20 degrees.

<Chemical Resistance>

Alkali Resistance Test:

The article was immersed in a 1N NaOH aqueous solution (pH: 14) for 5 hours, then washed with water and air-dried, whereupon the water contact angle was measured by the above-mentioned method. The smaller the decrease in water contact angle after the test, the smaller the decrease in performance due to alkali, and the better the alkali resistance. The evaluation standards are as follows.

⊚ (excellent): The change in water contact angle after the alkali resistance test is at most 5 degrees.

○ (good): The change in water contact angle after the alkali resistance test is more than 5 degrees and at most 10 degrees.

Δ (acceptable): The change in water contact angle after the alkali resistance test is more than 10 degrees and at most 20 degrees.

x (poor): The change in water contact angle after the alkali resistance test is more than 20 degrees.

Salt Spray Test (SST):

The salt spray test was carried out in accordance with JIS H8502. That is, the article was exposed to salt atmosphere in a salt spray tester (manufactured by Suga Test Instruments Co., Ltd.) for 300 hours, and then, the water contact angle was measured by the above-mentioned method. The smaller the decrease in water contact angle after the test, the smaller the decrease in performance due to salt water, and the better the salt water resistance. The evaluation standards are as follows.

⊚ (excellent): The change in water contact angle after the salt spray test is at most 5 degrees.

○ (good): The change in water contact angle after the salt spray test is more than 5 degrees and at most 10 degrees.

Δ (acceptable): The change in water contact angle after the salt spray test is more than 10 degrees and at most 20 degrees.

x (poor): The change in water contact angle after the salt spray test is more than 20 degrees.

<Fingerprint Stain Removability>

An artificial fingerprint liquid (liquid consisting of oleic acid and squalene) was deposited on a flat surface of a silicon rubber plug, and then, extra oil was wiped off by a nonwoven fabric (manufactured by Asahi Kasei Corporation, BEMCOT (registered trademark) M-3), to prepare a stamp for fingerprint. The fingerprint stamp was placed on the surface layer and pressed under a load of 9.8 N for 10 seconds. The haze at a portion having a fingerprint adhered, was measured by a haze meter and taken as an initial value. With respect to the portion having a fingerprint adhered, using a reciprocating traverse testing machine (manufactured by KNT Co.) having tissue paper attached, wiping was carried out under a load of 4.9 N. The value of haze was measured every one reciprocation for wiping, and the number of wiping times until the haze became at most 10% from the initial value, was measured. The smaller the number of wiping times, the easier the removal of fingerprint stain, and the better the fingerprint stain removability. The evaluation standards are as follows.

⊚ (excellent): The number of wiping times is at most 3 times.

◯ (good): The number of wiping times is from 4 to 5 times.

Δ (acceptable): The number of wiping times is from 6 to 8 times.

x (poor): The number of wiping times is at least 9 times.

<Light Resistance>

To the surface layer, by means of a tabletop xenon arc lamp type accelerated light resistance testing machine (manufactured by Toyo Seiki Seisaku-sho, Ltd., SUNTEST XLS+), light (650 W/m$^2$, 300 to 700 nm) was irradiated at a black panel temperature of 63° C. for 500 hours, whereupon the water contact angle was measured. The smaller the decrease in water contact angle after the accelerated light resistance test, the smaller the decrease in performance due to light, and the better the light resistance. The evaluation standards are as follows.

⊚ (excellent): The change in water contact angle after the accelerated light resistance test is at most 5 degrees.

◯ (good): The change in water contact angle after the accelerated light resistance test is more than 5 degrees and at most 10 degrees.

Δ (acceptable): The change in water contact angle after the accelerated light resistance test is more than 10 degrees and at most 20 degrees.

x (poor): The change in water contact angle after the accelerated light resistance test is more than 20 degrees.

<Lubricity>

The dynamic friction coefficient of the surface layer to an artificial skin (manufactured by Idemitsu Technofine Co., PBZ13001) was measured by means of a load variation type friction abrasion test system (manufactured by Shinto Scientific Co., Ltd., HHS2000) under conditions of a contact area of 3 cm×3 cm and a load of 0.98N. The smaller the dynamic friction coefficient, the better the lubricity. The evaluation standards are as follows.

⊚ (excellent): The dynamic friction coefficient is at most 0.3.

◯ (good): The dynamic friction coefficient is more than 0.3 and at most 0.4.

Δ (acceptable): The dynamic friction coefficient is more than 0.4 and at most 0.5.

x (poor): The dynamic friction coefficient is more than 0.5.

TABLE 1

| | Ex. | 11 | 12 | 13 | 14 | 15 |
|---|---|---|---|---|---|---|
| Fluorinated ether compound/ composition | Type | Composition (1): compound (1A-1) + byproduct | Composition (2): compound (1B-1) + byproduct | Composition (3): compound (1C-1) + byproduct | Composition (4): compound (1C-2) + byproduct | Compound (4-1) |
| | Conversion (%) in hydrosilylation | 100 | 100 | 100 | 100 | — |
| | Selectivity (%) in hydrosilylation | 81 | 82 | 80 | 82 | — |
| Dry coating method | Initial contact angle   Water | ⊚ | ◯ | ⊚ | ⊚ | ⊚ |
| | Initial contact angle   n-Hexadecane | ⊚ | ⊚ | ⊚ | ⊚ | ⊚ |
| | Abrasion resistance | ◯ | ◯ | Δ | Δ | Δ |
| Wet coating method | Initial contact angle   Water | ⊚ | ◯ | ⊚ | ⊚ | ⊚ |
| | Initial contact angle   n-Hexadecane | ⊚ | ⊚ | ⊚ | ⊚ | ⊚ |
| | Abrasion resistance | ◯ | ◯ | Δ | Δ | Δ |
| | Chemical resistance (alkali) | ⊚ | ⊚ | ◯ | ◯ | X |
| | Chemical resistance (salt water) | ⊚ | ⊚ | ⊚ | ◯ | Δ |
| | Fingerprint stain removability | ⊚ | ⊚ | ⊚ | ◯ | ⊚ |
| | Light resistance | ◯ | ◯ | ◯ | ◯ | X |
| | Lubricity | ⊚ | ⊚ | ◯ | Δ | ◯ |

TABLE 2

| | Ex. | 16 | 17 | 18 | 19 | 20 |
|---|---|---|---|---|---|---|
| Fluorinated ether compound/ composition | Type | Compound (4-2) | Composition (7): compound (2A-1) + byproduct | Composition (8): compound (5-1) + byproduct | Composition (9): compound (5-2) + byproduct | Compound (6-1) |
| | Conversion (%) in hydrosilylation | — | 100 | 100 | 100 | — |
| | Selectivity (%) in hydrosilylation | — | 81 | 95 | 94 | — |
| Dry coating method | Initial contact angle   Water | ◯ | Δ | ⊚ | ◯ | ⊚ |
| | Initial contact angle   n-Hexadecane | ◯ | Δ | ⊚ | ⊚ | ⊚ |
| | Abrasion resistance | X | X | X | X | X |
| Wet coating method | Initial contact angle   Water | ◯ | Δ | ⊚ | ◯ | ⊚ |
| | Initial contact angle   n-Hexadecane | ◯ | Δ | ⊚ | ⊚ | ⊚ |
| | Abrasion resistance | Δ | X | X | X | X |
| | Chemical resistance (alkali) | X | ◯ | ⊚ | ⊚ | ◯ |
| | Chemical resistance (salt water) | X | ◯ | ⊚ | ⊚ | ◯ |
| | Fingerprint stain removability | ◯ | X | ⊚ | ⊚ | ⊚ |
| | Light resistance | X | X | Δ | Δ | Δ |
| | Lubricity | Δ | Δ | ⊚ | ⊚ | ⊚ |

In Ex. 11 to 14 wherein the present compound having no ester bond and having two hydrolyzable silyl groups at one terminal, was used, the water/oil repellency, abrasion resistance, chemical resistance, fingerprint stain removability, lubricity and light resistance were excellent.

In Ex. 15 and 16 wherein the compound (4-1) or (4-2) having an ester bond and having two hydrolyzable silyl groups at one terminal, was used, the chemical resistance and light resistance were inferior. The reason for inferior chemical resistance is considered to be such that the compound had an ester bond having high hydrolyzability. The reason for inferior light resistance is considered to be such that the compound had an ester bond having a low binding energy.

In Ex. 17 wherein the compound (2A-1) having two hydrolyzable silyl groups at both terminals was used, the abrasion resistance, fingerprint stain removability and light resistance were inferior. The reason for inferior fingerprint stain removability is considered to be such that unreacted terminal groups reduced the surface properties. The reason for inferior abrasion resistance is considered to be such that both terminals were fixed to the substrate.

In Ex. 18 to 20 wherein the compound (6-1) or the composition containing the compound (5-1) or (5-2) having only one hydrolyzable silyl group at one terminal, was used, the abrasion resistance was inferior. The reason for inferior abrasion resistance is considered to be such that there was only one group reactive to the substrate, and thus, the adhesion to the substrate was inadequate.

Ex. 21 to 35: Production and Evaluation of Articles

The compound (3A-1) isolated in Ex. 1-1 was prepared.
The compound (1B-1) obtained in Ex. 2-3 was prepared.
The compound (2A-1) obtained in Ex. 7-3 was prepared.
In the proportions shown in Table 3, the compound (1B-1), the compound (2A-1) and the compound (3A-1) were mixed, to prepare compositions. Using each composition, an article was prepared by the wet coating method as described above.

With respect to the article, measurement of the contact angles, and evaluation of the abrasion resistance and lubricity were carried out. The results are shown in Table 3.

silyl group at both terminals was added, when the proportion of the compound (3A-1) was less than 40 mass %, the surface layer had a practical performance. As the proportion of the compound (3A-1) was increased, the abrasion resistance tended to decrease.

From Ex. 31 to 35, it was found that in a case where to the present compound having two hydrolyzable silyl groups at one terminal, the compound (2A-1) having two hydrolyzable silyl groups at both terminals and the compound (3A-1) having no hydrolyzable silyl group at both terminals were added at the same time, when the total proportion of the compound (2A-1) and the compound (3A-1) was less than 40 mass %, the surface layer had a practical performance. As the total proportion of the compound (2A-1) and the compound (3A-1) was increased, the abrasion resistance tended to decrease.

INDUSTRIAL APPLICABILITY

The fluorinated ether compound of the present invention can be suitably used for surface treatment to impart water/oil repellency to the surface of a substrate such as a member constituting the surface of a touch panel to be touched with a finger.

This application is a continuation of PCT Application No. PCT/JP2016/075356, filed on Aug. 30, 2016, which is based upon and claims the benefit of priority from Japanese Patent Application No. 2015-171987 filed on Sep. 1, 2015. The contents of those applications are incorporated herein by reference in their entireties.

What is claimed is:

1. A fluorinated ether compound represented by the following formula (1):

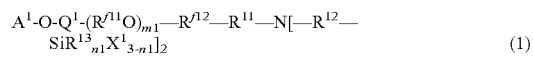

$$A^1\text{-}O\text{-}Q^1\text{-}(R^{f11}O)_{m1}\text{-}R^{f12}\text{-}R^{11}\text{-}N[\text{-}R^{12}\text{-}SiR^{13}_{n1}X^1_{3-n1}]_2 \quad (1)$$

wherein $A^1$ is a $C_{1\text{-}20}$ perfluoroalkyl group, $Q^1$ is a single bond, a fluoroalkylene group containing at least one hydrogen atom, a fluoroalkylene group containing at least one hydrogen atom and having an etheric oxygen atom at its terminal other than the terminal on the side bonded to $A^1$-O, a fluoroalkylene group with at least two carbon atoms containing at least one hydrogen atom and having an etheric oxygen atom between its carbon-carbon atoms, or a fluoroalkylene group with at least two carbon atoms containing at least one hydrogen atom and having an etheric oxygen atom between its carbon-carbon atoms and at its terminal other than the terminal on the side bonded to $A^1$-O, $R^{f11}$ and $R^{f12}$ are each independently a perfluoroalkylene group, m1 is an integer of from 2 to 200,

TABLE 3

|  | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|
| Compound (3A-1) (%) | 0 | 0 | 0 | 0 | 0 | 5 | 10 | 20 | 30 | 40 | 5 | 10 | 15 | 25 | 30 |
| Compound (1B-1) (%) | 95 | 90 | 80 | 70 | 60 | 95 | 90 | 80 | 70 | 60 | 90 | 80 | 70 | 50 | 40 |
| Compound (2A-1) (%) | 5 | 10 | 20 | 30 | 40 | 0 | 0 | 0 | 0 | 0 | 5 | 10 | 15 | 25 | 30 |
| Initial contact angle — Water | ○ | ○ | ○ | ○ | △ | ○ | ○ | ○ | ○ | ○ | ○ | ○ | ○ | ○ | △ |
| Initial contact angle — n-Hexadecane | ◎ | ◎ | ◎ | ○ | ○ | ◎ | ◎ | ◎ | ◎ | ◎ | ◎ | ◎ | ◎ | ○ | ○ |
| Abrasion resistance | ◎ | ◎ | ○ | △ | X | ○ | ○ | ○ | △ | X | ◎ | ◎ | ○ | X | X |
| lubricity | ◎ | ◎ | ○ | △ | X | ◎ | ◎ | ◎ | ◎ | ◎ | ◎ | ◎ | ○ | ○ | △ |

From Ex. 21 to 25, it was found that in a case where to the present compound having two hydrolyzable silyl groups at one terminal, the compound (2A-1) having two hydrolyzable silyl groups at both terminals was added, when the proportion of the compound (2A-1) was less than 40 mass %, the surface layer had a practical performance. As the proportion of the compound (2A-1) was increased, the abrasion resistance and lubricity tended to decrease.

From Ex. 26 to 30, it was found that in a case where to the present compound having two hydrolyzable silyl groups at one terminal, the compound (3A-1) having no hydrolyzable $(R^{f11}O)_{m1}$ is composed of one type of $R^{f11}O$ or at least two types of $R^{f11}O$, $R^{11}$ is a single bond, an alkylene group, an alkylene group having an etheric oxygen atom or —NH— at its terminal other than the terminal on the side bonded to N, an alkylene group with at least two carbon atoms having an etheric oxygen atom or —NH— between its carbon-carbon atoms, or an alkylene group with at least two carbon atoms having an etheric oxygen atom or —NH— between its carbon-carbon atoms and at its terminal other than the terminal on the side bonded to N, $R^{12}$ is an alkylene group, or an alkylene group with at least two carbon atoms having an etheric oxygen atom or —NH— between its carbon-carbon atoms, $R^{13}$ is a hydrogen atom or a monovalent hydrocarbon group, $X^1$ is a hydrolyzable group, n1 is an integer of from 0 to 2, and two $[—R^{12}—SiR^{13}{}_{n1}X^1{}_{3-n1}]$ groups are the same or different from each other.

2. The fluorinated ether compound according to claim 1, wherein $R^{f11}$ and $R^{f12}$ are each independently a $C_{1-6}$ perfluoroalkylene group.

3. The fluorinated ether compound according to claim 1, wherein $R^{f11}$ and $R^{f12}$ are each independently a perfluoroalkylene group having no branched structure.

4. The fluorinated ether compound according to claim 1, wherein $(R^{f11}O)_{m1}$ has $\{(CF_2O)_{x1}(CF_2CF_2O)_{x2}\}$ where (wherein each of x1 and x2 is an integer of at least 1 and x1+x2 is an integer of at least 2 and at most m1, and wherein the formula $\{(CF_2O)_{x1}(CF_2CF_2O)_{x2}\}$ represents a structure in which x1 pieces of $(CF_2O)$ and x2 pieces of $(CF_2CF_2O)$ are randomly arranged.

5. The fluorinated ether compound according to claim 1, wherein $(R^{f11}O)_{m1}$ has $(CF_2CF_2O—CF_2CF_2CF_2CF_2O)_{x3}$ where x3 is an integer of at least 1 and at most m1/2.

6. The fluorinated ether compound according to claim 1, wherein $Q^1$ is a single bond, $—R^5O—$ or $—R^{f5}O—R^{f6}O—$, where $R^{f5}$ and $R^{f6}$ are each independently a $C_{2-6}$ fluoroalkylene group having a hydrogen atom.

7. The fluorinated ether compound according to claim 1, wherein $R^{11}$ is a group selected from the group consisting of —CH$_2$—, —CH$_2$CH$_2$—, —CH$_2$CH$_2$CH$_2$—, —CH$_2$OCH$_2$CH$_2$— and —CH$_2$NHCH$_2$CH$_2$—.

8. The fluorinated ether compound according to claim 1, wherein $R^{12}$ is —CH$_2$CH$_2$CH$_2$— or —CH$_2$CH$_2$OCH$_2$CH$_2$CH$_2$—.

9. The fluorinated ether compound according to claim 1, which has a number average molecular weight of from 500 to 20,000.

10. A fluorinated ether composition, comprising:
a fluorinated ether compound of claim 1; and
a second fluorinated ether compound other than the fluorinated ether compound,
wherein a total amount of the fluorinated ether compound and the second fluorinated ether compound in the fluorinated ether composition is from 80 to 100 mass % with respect to a mass of the fluorinated ether composition, and
an amount of the second fluorinated ether compound is more than 0 mass % and less than 40 mass % with respect the total amount of the fluorinated ether compound and the second fluorinated ether compound.

11. The fluorinated ether composition according to claim 10, wherein the second fluorinated ether compound is at least one member selected from the group consisting of:

Fluorinated ether compound (2): A fluorinated ether compound wherein in the fluorinated ether compound represented by the formula (1), a group having $—N[—R^{12}—SiR^{13}{}_{n1}X^1{}_{3-n1}]_2$ is bonded to both sides of $(R^{f11}O)_{m1}$, Fluorinated ether compound (3): A fluorinated ether compound wherein in the fluorinated ether compound represented by the formula (1), a group having $A^1$ is bonded to both sides of $(R^{f11}O)_{m1}$, and Fluorinated ether compound (4): A fluorinated ether compound wherein in the fluorinated ether compound represented by the formula (1), $—N[—R^{12}—SiR^{13}{}_{n1}X^1{}_{3-n1}]_2$ is substituted by $—N[—R^{12}—SiR^{13}{}_{n1}X^1{}_{3-n1}]_{2-t}[—R^{15}]_t$, where $R^{15}$ is an unsaturated bond-containing group which becomes $—R^{12}—SiR^{13}{}_{n1}X^1{}_{3-n1}$ by addition of $HSiR^{13}{}_{n1}X^1{}_{3-n1}$, or an isomer group of the unsaturated bond-containing group, and t is 1 or 2.

12. A coating liquid, comprising:
the fluorinated ether compound of claim 1; and
a liquid medium.

13. A coating liquid, comprising:
the fluorinated ether composition of claim 10; and
a liquid medium.

14. An article having a surface layer comprising the fluorinated ether compound of claim 1.

15. An article having a surface layer formed of the fluorinated ether composition of claim 10.

16. The fluorinated ether compound according to claim 1, wherein $R^{11}$ is an alkylene group, an alkylene group having an etheric oxygen atom or —NH— at its terminal other than the terminal on the side bonded to N, an alkylene group with at least two carbon atoms having an etheric oxygen atom or —NH— between its carbon-carbon atoms, or an alkylene group with at least two carbon atoms having an etheric oxygen atom or —NH— between its carbon-carbon atoms and at its terminal other than the terminal on the side bonded to N.

* * * * *